(12) United States Patent
Newman et al.

(10) Patent No.: US 11,754,222 B1
(45) Date of Patent: Sep. 12, 2023

(54) ACCESSORY MOUNTING TRACK WITH ONE OR MORE DISCRETE LOCKING POSITIONS

(71) Applicant: YakAttack, LLC, Farmville, VA (US)

(72) Inventors: Daniel Anderson Newman, Salem, VA (US); Luther Cifers, Farmville, VA (US)

(73) Assignee: YakAttack, LLC, Farmville, VA (US)

( * ) Notice: Subject to any disclaimer, the term of this patent is extended or adjusted under 35 U.S.C. 154(b) by 0 days.

(21) Appl. No.: 17/732,042

(22) Filed: Apr. 28, 2022

Related U.S. Application Data

(63) Continuation of application No. 17/157,493, filed on Jan. 25, 2021, now Pat. No. 11,333,298, which is a continuation of application No. 16/351,422, filed on Mar. 12, 2019, now Pat. No. 10,900,607.

(60) Provisional application No. 62/642,896, filed on Mar. 14, 2018.

(51) Int. Cl.
    *F16M 13/02* (2006.01)
(52) U.S. Cl.
    CPC ................. *F16M 13/022* (2013.01)
(58) Field of Classification Search
    None
    See application file for complete search history.

(56) References Cited

U.S. PATENT DOCUMENTS

| | | | |
|---|---|---|---|
| 2,688,289 A | 9/1954 | Sterling | |
| 2,879,969 A | 3/1959 | Bamberger | |
| 2,891,490 A * | 6/1959 | Elsner | B61D 45/001 410/105 |
| 3,432,197 A | 3/1969 | Albertine et al. | |
| 3,713,616 A * | 1/1973 | Bowers | B63B 25/002 410/105 |
| 4,047,689 A | 9/1977 | Grendahl | |
| 4,708,549 A | 11/1987 | Jensen | |
| 4,878,640 A | 11/1989 | Fricker et al. | |
| 5,302,065 A | 4/1994 | Vogg et al. | |
| 5,685,517 A | 11/1997 | Salibra | |
| 7,040,849 B2 | 5/2006 | Cunningham et al. | |
| 7,497,651 B2 | 3/2009 | Harberts et al. | |

(Continued)

OTHER PUBLICATIONS

US Patent and Trademark Office, Office Action, dated Oct. 4, 2021, in related U.S. Appl. No. 17/157,493, filed Jan. 25, 2021.

*Primary Examiner* — Monica E Millner
(74) *Attorney, Agent, or Firm* — Thedford I. Hitaffer

(57) ABSTRACT

An accessory device is provided with one or more physical interlocks for mating with a slot provided along an accessory mounting track, or alternatively, with discrete physical mating interlocking features provided along an accessory mounting track, such as along opposing sides of the slot. In this way, the accessory device can be mounted along the slot in a lengthwise direction of the accessory mounting track or perpendicularly or transversely to the lengthwise direction of the accessory mounting track. When mounting in a lengthwise direction of the accessory mounting track, the accessory device is prevented from moving along the accessory mounting track when sufficient frictional forces are applied. When mounting perpendicularly or transversely to the lengthwise direction of the accessory mounting track, the interlocks mate with the interlocking features to prevent movement of the accessory device along the accessory mounting track.

17 Claims, 26 Drawing Sheets

(56) References Cited

U.S. PATENT DOCUMENTS

| | | | |
|---|---|---|---|
| 7,547,170 B2 | 6/2009 | Womack et al. | |
| 7,861,996 B2 | 1/2011 | Siqueira | |
| 7,874,774 B2 | 1/2011 | Peterson | |
| 7,980,798 B1 | 7/2011 | Kuehn et al. | |
| 8,057,143 B2 | 11/2011 | Adams | |
| 9,623,787 B2 | 4/2017 | Sterling | |
| 9,671,060 B1 | 6/2017 | Cifers | |
| 9,828,073 B1 | 11/2017 | Cifers | |
| 9,863,576 B1 | 1/2018 | Cifers | |
| 9,902,498 B2 * | 2/2018 | Gensch | B60N 2/01575 |
| 9,975,466 B2 | 5/2018 | Hendren et al. | |
| 10,435,117 B1 | 10/2019 | Cifers et al. | |
| 10,604,930 B2 | 3/2020 | Downey | |
| 10,676,196 B2 | 6/2020 | Pacheco et al. | |
| 11,214,374 B2 * | 1/2022 | Lucas | B64D 11/0696 |
| 2003/0095846 A1 * | 5/2003 | Breckel | B61D 45/001 |
| | | | 410/104 |
| 2004/0131440 A1 | 7/2004 | Womack et al. | |
| 2005/0269465 A1 | 12/2005 | Carnevali | |
| 2009/0026827 A1 * | 1/2009 | Bishop | B60P 7/0815 |
| | | | 297/463.1 |
| 2010/0124457 A1 * | 5/2010 | Cook | B60N 2/01558 |
| | | | 403/14 |
| 2012/0045276 A1 | 2/2012 | Carnevali | |
| 2014/0271021 A1 | 9/2014 | Cardona | |
| 2015/0047197 A1 | 2/2015 | Deloubes | |
| 2016/0251082 A1 | 9/2016 | Shih et al. | |
| 2018/0029846 A1 | 2/2018 | VerBrugge et al. | |
| 2018/0363842 A1 | 12/2018 | Carnevali | |

* cited by examiner

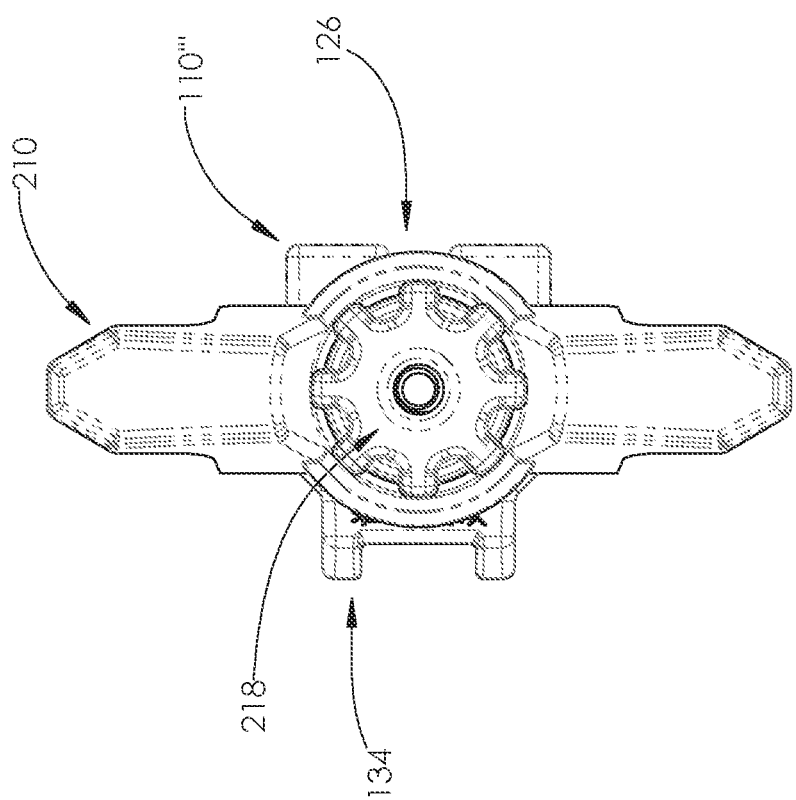

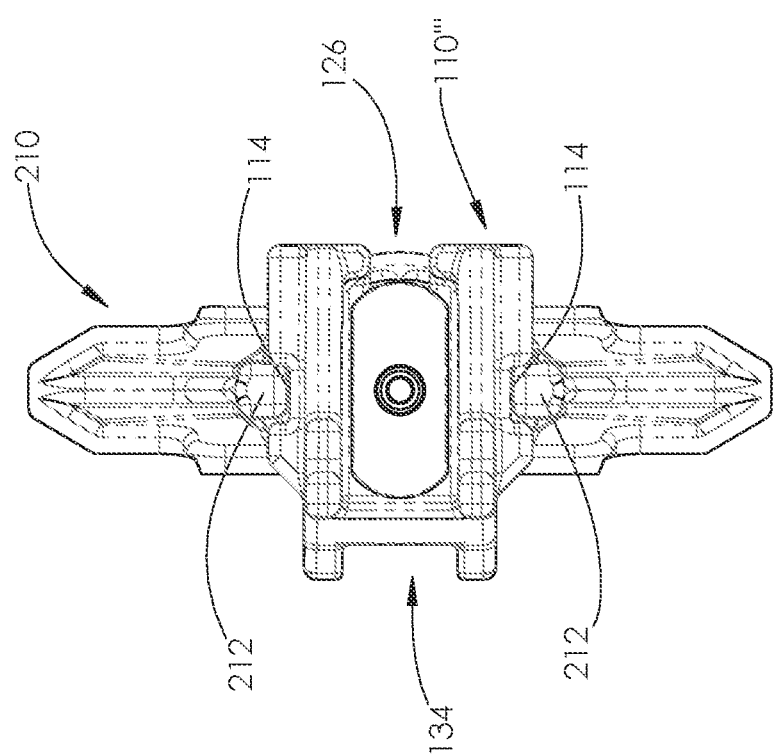

ACCESSORY MOUNTING TRACK WITH ONE OR MORE DISCRETE LOCKING POSITIONS

CROSS-REFERENCE TO RELATED APPLICATIONS

This application is a continuation application of U.S. patent application Ser. No. 17/157,493, filed on Jan. 25, 2021, which is a continuation application of U.S. patent application Ser. No. 16/351,422, filed on Mar. 12, 2019, issued as U.S. Pat. No. 10,900,607, on Jan. 26, 2021, which claims the benefit of U.S. Provisional Application No. 62/642,896, filed Mar. 14, 2018, the disclosures of which is incorporated herein by reference in their entirety.

BACKGROUND OF THE INVENTION

The present invention relates in general to the connection of accessory devices to an environment, such as vehicles or structures, and more particularly, to an accessory mounting track that may be fixed to an environment to provide one or more discrete secure attachment points for various accessory devices.

Accessory devices, such as camera mounts, fishing rod holders, personal electronics cradles, marine depth finders, visibility beacons, and various other implements, frequently require quick and easy attachment to and removal from environments, such as vehicles or structures, such as personal watercraft, boats, all-terrain vehicles, airplanes, automobiles, military vehicles and other vehicles or structures utilizing such devices.

In addition to the foregoing devices, other items associated with various environments are commonly stored and organized. Many other environments contain a variety of items that need to be stored or organized. Within the scope herein, the term "device" shall also refer to any item that may be stored or organized in a given environment, or a bracket designed to support such an item.

In some cases, it may be desirable to alter the deployment configuration of devices, either by arrangement or position. It may also be desirable to interchangeably attach such devices to a fixed mount and track system, wherein the fixed mount provides a rigid single point of attachment of an accessory device and the track provides a range of deployment positions that may be altered during attachment or while being used in the field.

Tracks for mounting accessory devices often include a slot for receiving a T-bolt that cooperates with a device for positioning and securing the device to the track along the slot. When securing devices to the track, static friction is leveraged to hold the device in a desired position. Rubber washers, textured surfaces or other means may be used to increase the static friction between the track and the device to aid in securing the device against movement in relation to the track due to external forces acting on the device. Further, rotation of the device can overtighten the device with respect to the track or loosen the device to the point of failure. Additionally, tightening the device relative to the track to compress the device against the track may require varying degrees of grip, strength, texture, and material to secure the device to the track. This can result in difficulty in removing the device or a failure to adequately secure the device in relation to the track.

There remains a need for an accessory mounting track for quick and easy attachment and removal of an accessory device to and from an environment, while reducing the risk of overtightening the device, or allowing the device to be inadvertently loosened to a point of failure.

SUMMARY OF THE INVENTION

The present invention solves the aforementioned problems by providing one or more physical interlocks on an accessory device for mating with a slot provided along an accessory mounting track, or alternatively, with one or more discrete physical mating interlocking features provided along an accessory mounting track, such as along opposing sides of the slot. In accordance with this configuration, the accessory device can be mounted along the slot in a lengthwise direction of the accessory mounting track or perpendicularly or transversely to the lengthwise direction of the accessory mounting track. When mounted in a lengthwise direction of the accessory mounting track, the accessory device is prevented from moving along the accessory mounting track when sufficient frictional forces are applied. When mounted perpendicularly or transversely to the lengthwise direction of the accessory mounting track, the interlocks mate with the interlocking features, resulting in physical interference, to prevent movement of the accessory device along the accessory mounting track when attached thereto.

Various advantages of this invention will become apparent to those skilled in the art from the following detailed description of the preferred embodiment, when read in light of the accompanying drawings.

BRIEF DESCRIPTION OF THE DRAWINGS

Various features and attendant advantages of the accessory mounting track will become more fully appreciated when considered in view of the accompanying drawings, in which like reference characters designate the same or similar parts and/or features throughout the several views, and wherein:

FIG. 26 is a top plan view of the accessory mounting track and base shown in FIG. 22, and FIG. 27 is a bottom view of the accessory mounting track and base shown in FIG. 22.

DETAILED DESCRIPTION OF THE PREFERRED EMBODIMENT

Figure 1:
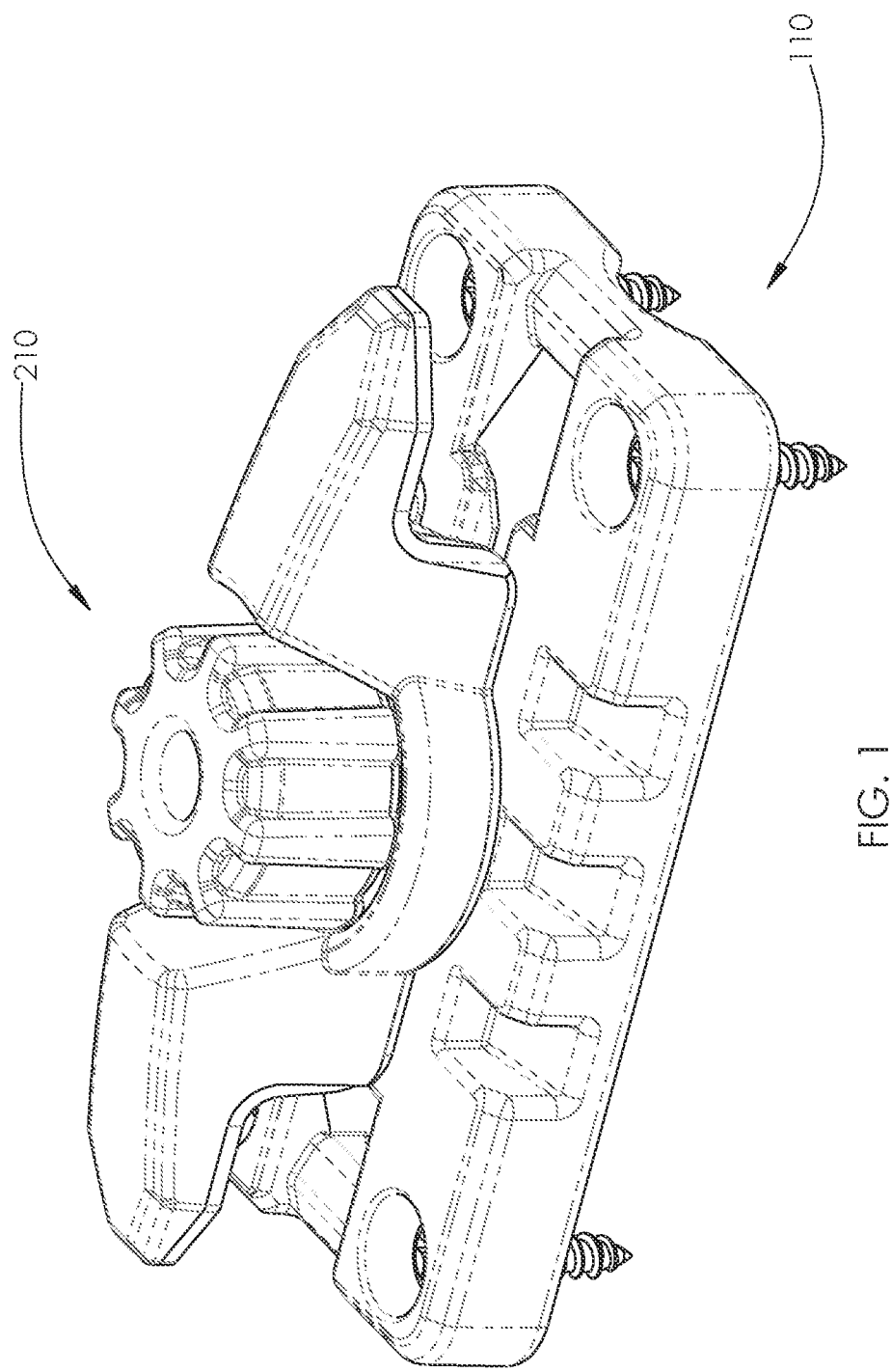
FIG. 1 is a side perspective view of an exemplary accessory mounting track according to the invention with an exemplary accessory device secured in a first direction thereto.
Figure 2:
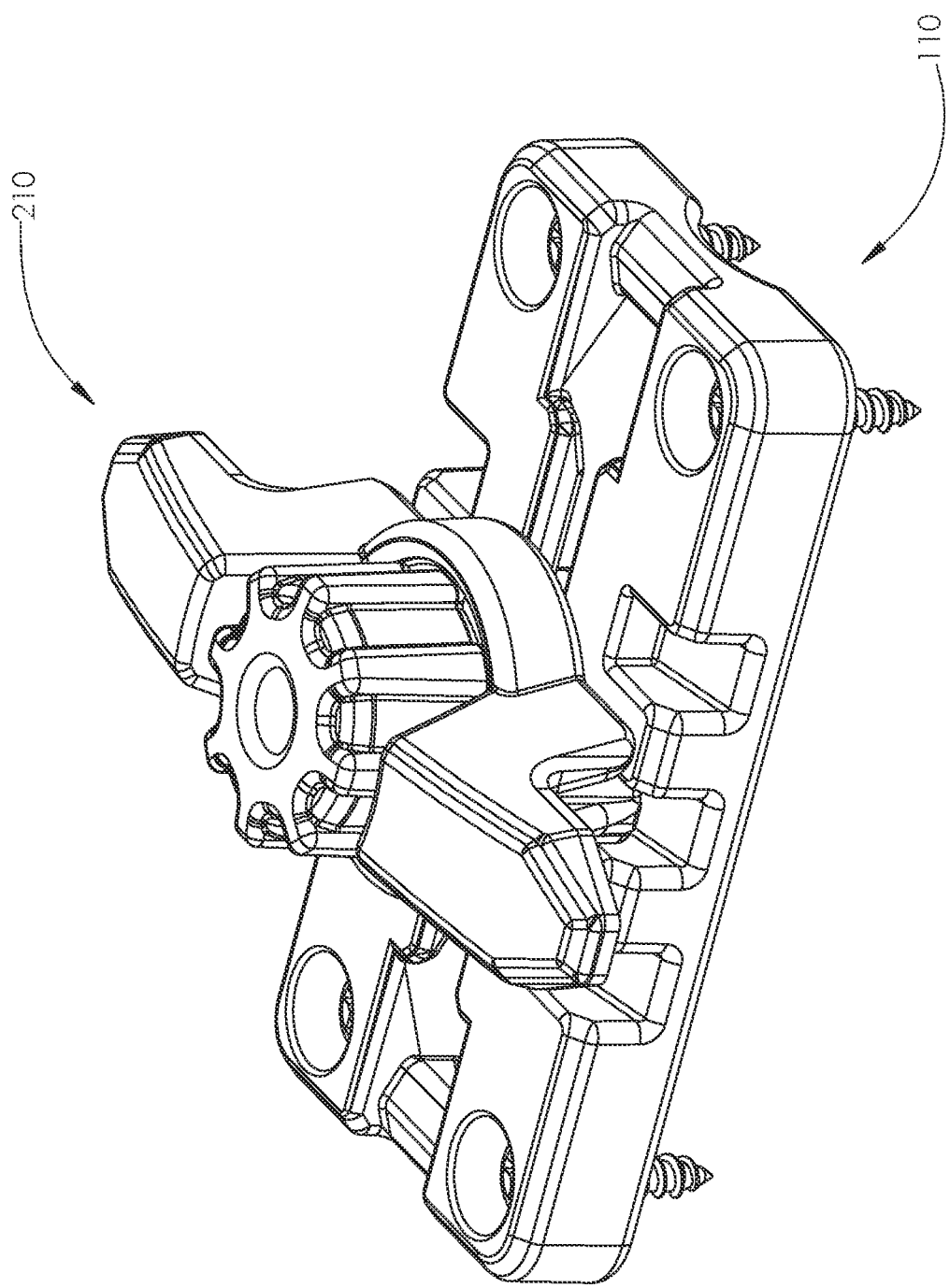
FIG. 2 is a side perspective view of the accessory mounting track shown in FIG. 1 with the accessory device secured in a second direction transverse to the first direction.

Referring now to the drawings, there is illustrated in FIG. 1 an exemplary accessory mounting track 110 according to the invention with an exemplary accessory device 210 secured in a first direction thereto. The accessory device 210 may be secured to the accessory mounting track 110 in a second direction transverse to the first direction, as shown in FIG. 2.

Figure 3:
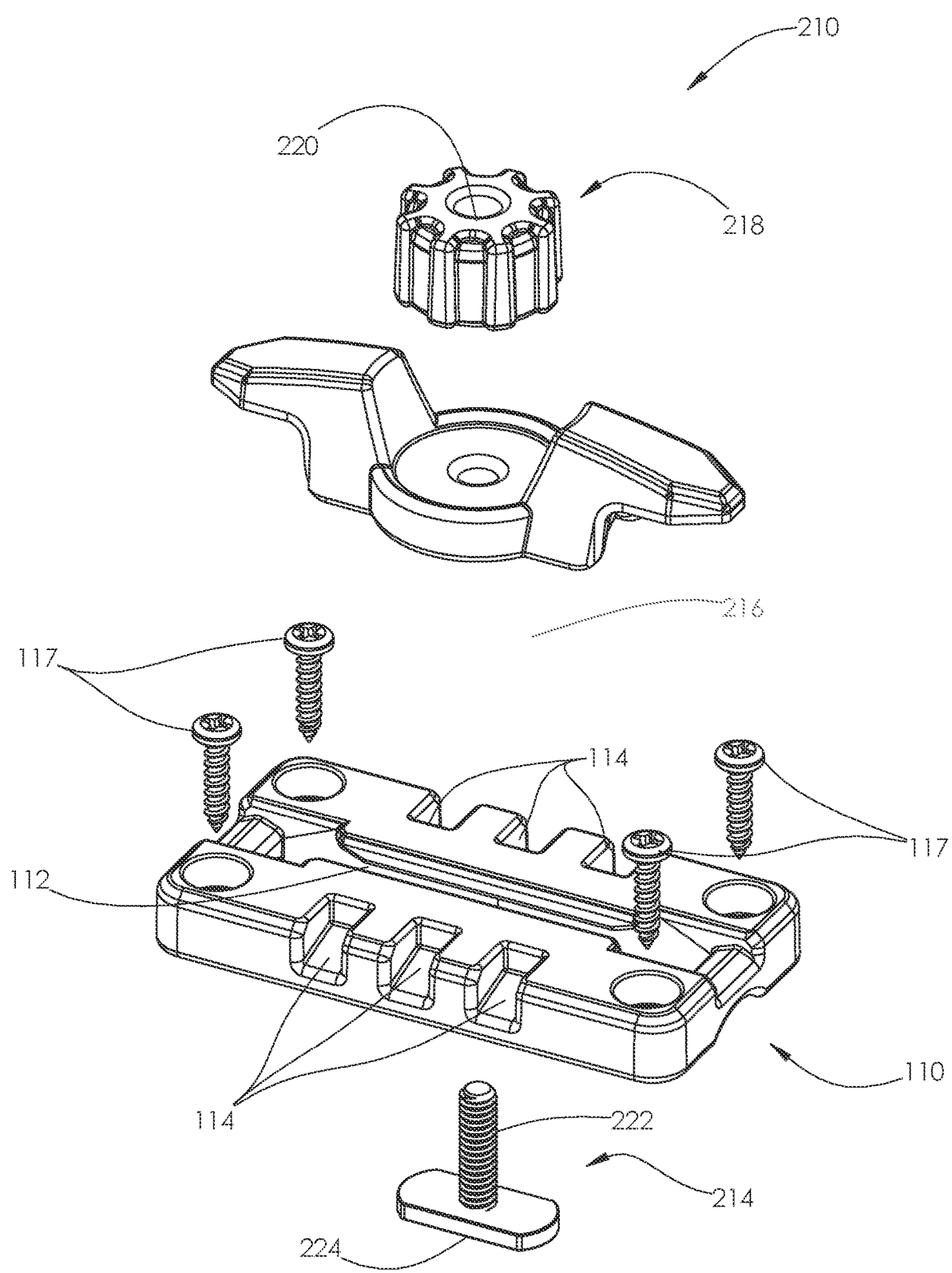
FIG. 3 is an exploded side perspective view of the accessory mounting track and accessory device shown in FIG. 1.

An exploded side perspective view of the accessory mounting track 110 and the accessory device 210 is shown in FIG. 3. The present invention leverages one or more physical interlocks 212 (e.g., keys, tabs, nodules) (shown in FIG. 13) on the accessory device 210 with a slot 112 provided in the accessory mounting track 110, or alternatively, with one or more discrete physical mating interlocking features 114 (e.g., pockets) provided along an accessory mounting track 110, such as along opposing sides of the slot 112.

The interlocks 212, upon tightening of a fastener, such as a T-bolt 214, mate with the slot 112 or interlocking features 114 to resist or interfere with movement or translation of the accessory device 210 along the slot 112, or in relation to the accessory mounting track 110. The interference does not rely upon the relative tightness or force applied when tightening the accessory device 110 in relation to the T-bolt 214. This allows for easy attachment and removal of the accessory device 210 to and from the accessory mounting track 110 at one or a plurality of discrete positions corresponding to the one or more discrete physical mating interlocking features 114 along the accessory mounting track 110. Alternatively, the accessory device 210 may be easily attached and removed to and from the accessory mounting track 110 with the interlocks 212 mating with the slot 112 anywhere along the slot 112 so that the position of the accessory device 210 is not restricted to the discrete positions of the interlocking features 114 along the accessory mounting track 110. One of the benefits of the invention is that it allows the accessory device 210 to be positively secured to the accessory mounting track 110, with ease of use, particularly for those with arthritis or other issues with gripping and strength when trying to tighten or loosen the accessory device 210 securely.

As shown in the drawing, a rubber washer 216, textured surfaces or other means may be used to increase static friction between the accessory mounting track 110 and the accessory device 210 to aid in securing the accessory device 210 against movement in relation to the accessory mounting track 110 due to external forces acting on the accessory device 210.

The exemplary accessory device 210 is in the form of a cleat, which is in the form of a T-shaped piece that may be particularly adapted for use on a personal watercraft or boat, and to which a rope may be attached. The cleat may be formed from wood, metal, plastic, or other suitable material.

The exemplary accessory device 210 includes a knob 218 that threadably cooperates with the T-bolt 214, such as by threaded engagement. For example, the knob 218 may be provided with a female threaded through hole 220 for receiving a threaded stud 222 of the T-bolt 214. Threading the knob 218 in relation to the threaded stud 222 of the T-bolt 214 toward the accessory device 210 tightens the accessory device 210 in relation to the accessory mounting track 110.

The accessory mounting track 110 may be fixed to environments, such as vehicles or structures, such as personal watercraft, boats, all-terrain vehicles, airplanes, automobiles, military vehicles and other vehicles or structures utilizing such devices. This may be accomplished in any suitable manner. For example, in the illustrated embodiment, the accessory mounting track 110 may be provided with mounting holes, such as the countersunk attachment holes 116 (shown in FIG. 3), for receiving tapered fasteners, such as the flat, socket head cap screws 117 shown, which may be fastened in any suitable manner in relation to the environment.

Figure 4:
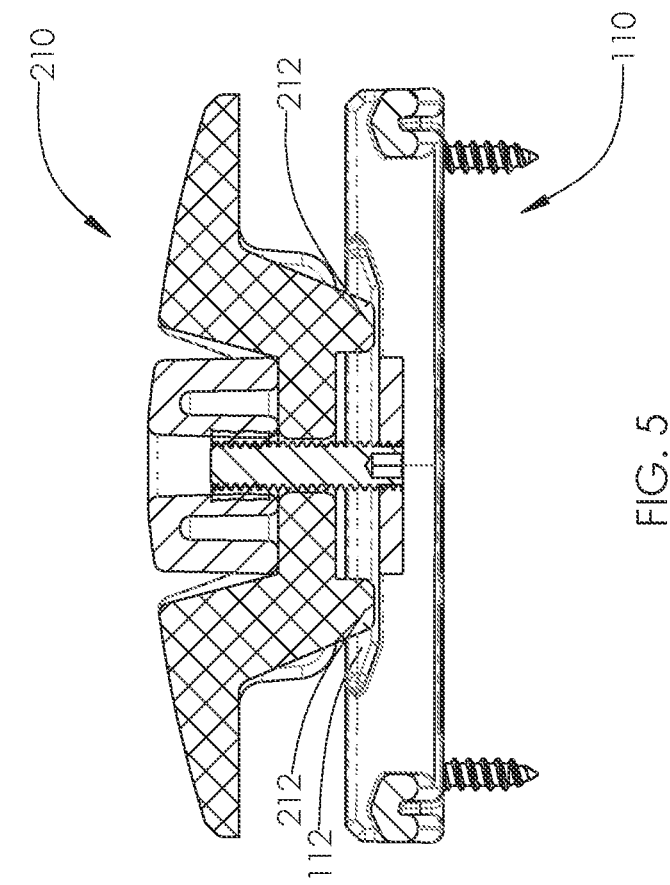
FIG. 4 is an end view of the accessory mounting track shown in FIG. 1.
Figure 5:
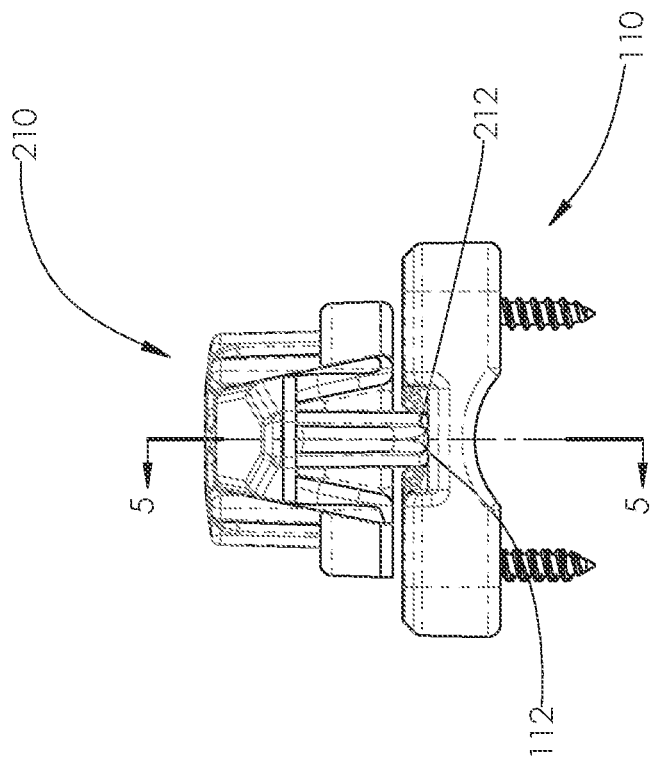
FIG. 5 is a cross-sectional view of the accessory mounting track taken along the line 5-5 in FIG. 4.

As shown in FIGS. 4 and 5, the accessory device 210 is tightened in relation to the accessory mounting track 110 with the physical interlocks 212 on the accessory device 210 mating with the slot 112. In this manner, the accessory device 210 is mounted parallel to or in a lengthwise direction of the accessory mounting track 110.

Figure 6:
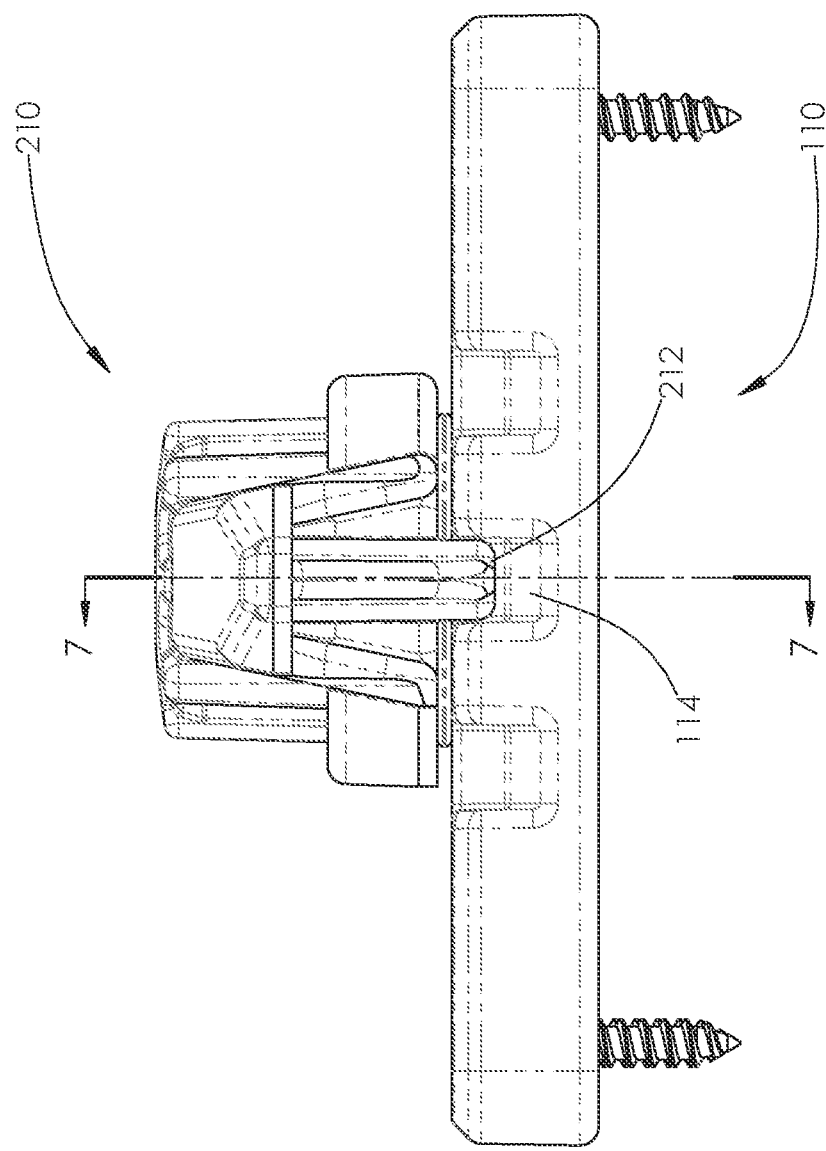
FIG. 6 is a side elevational view of the accessory mounting track shown in FIG. 1.
Figure 7:
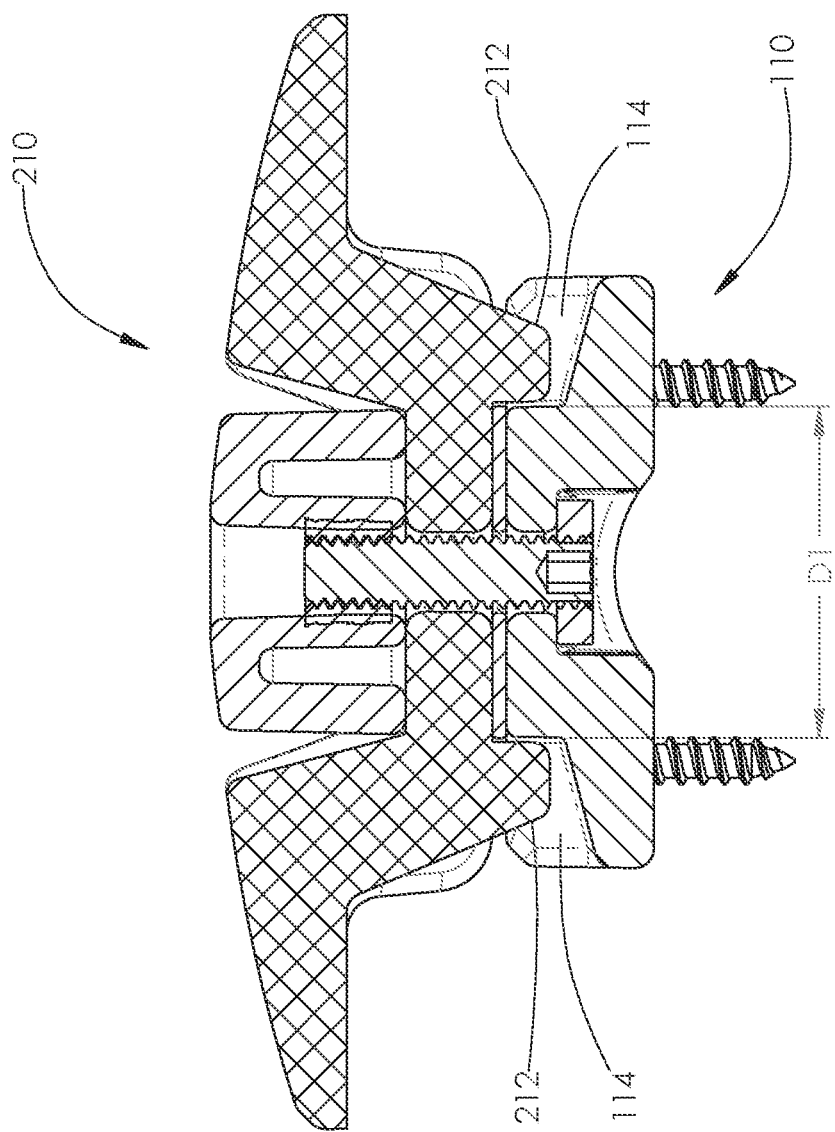
FIG. 7 is a cross-sectional view of the accessory mounting track taken along the line 7-7 in FIG. 6.
Figure 8:
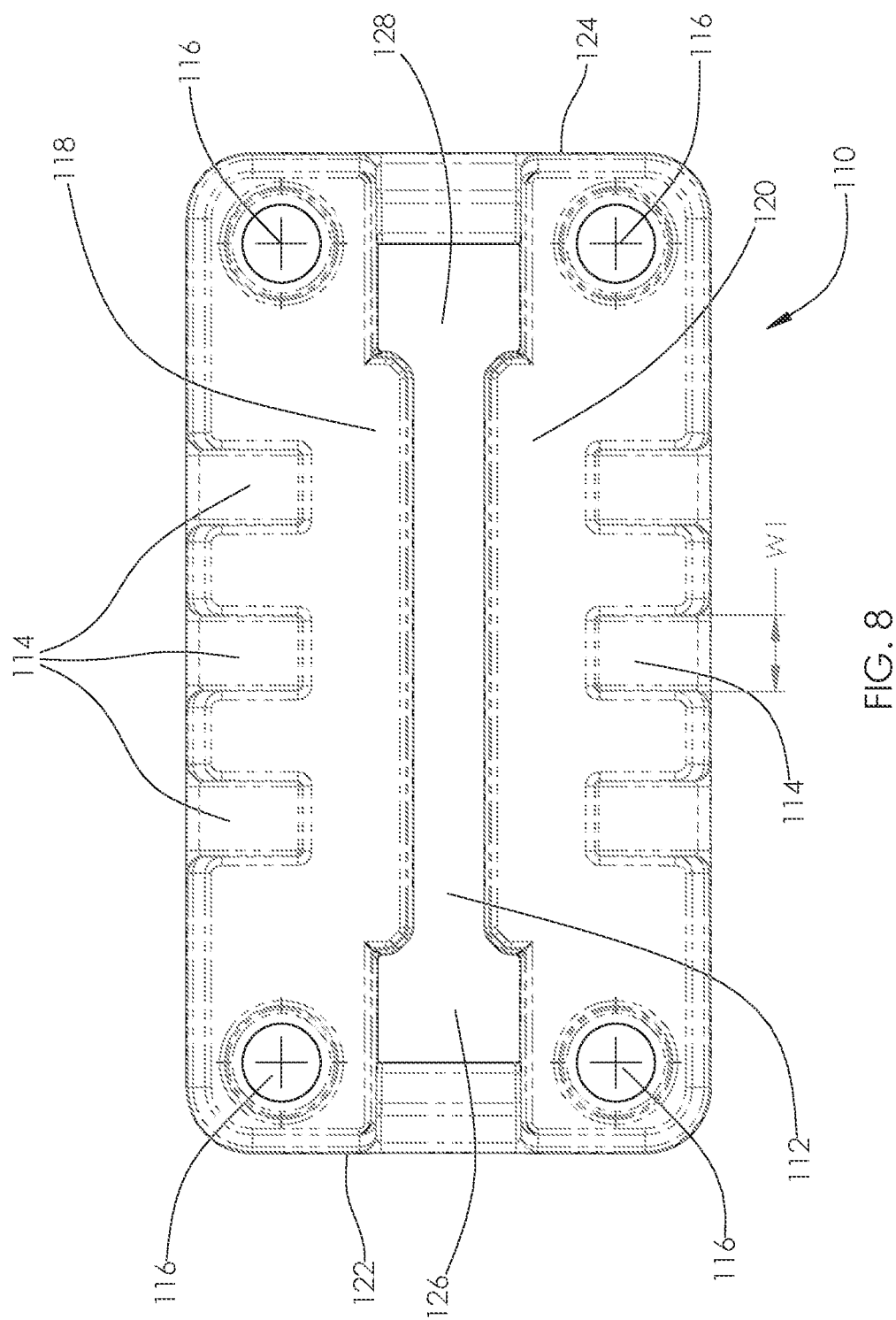
FIG. 8 is a top plan view of the accessory mounting track shown in FIG. 1.
Figure 9:
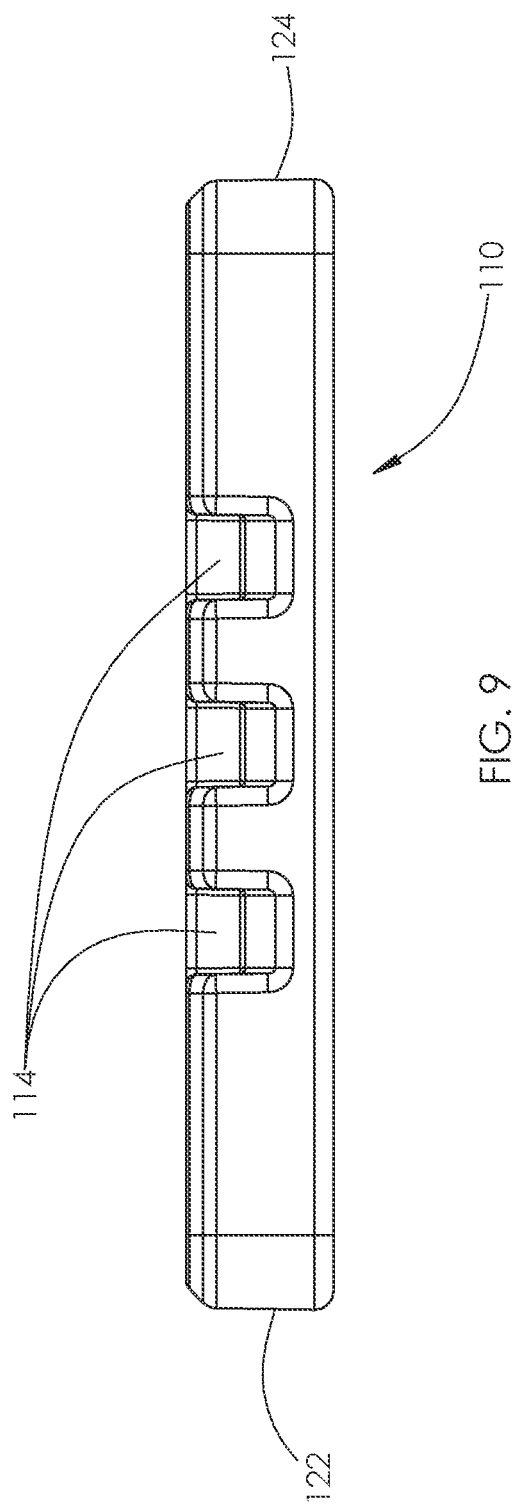
FIG. 9 is a side elevational view of the accessory mounting track shown in FIG. 8.
Figure 10:
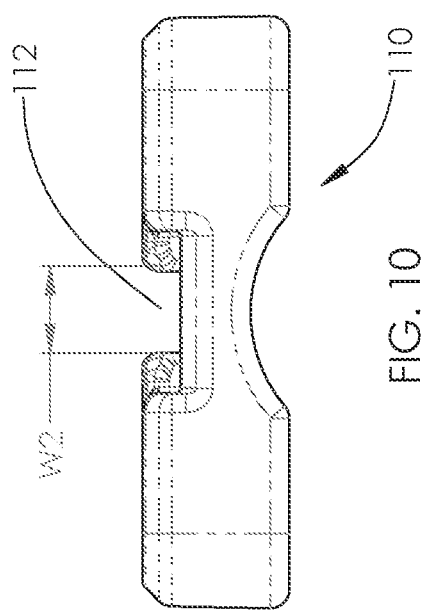
FIG. 10 is an end view of the accessory mounting track shown in FIG. 8.
Figure 11:
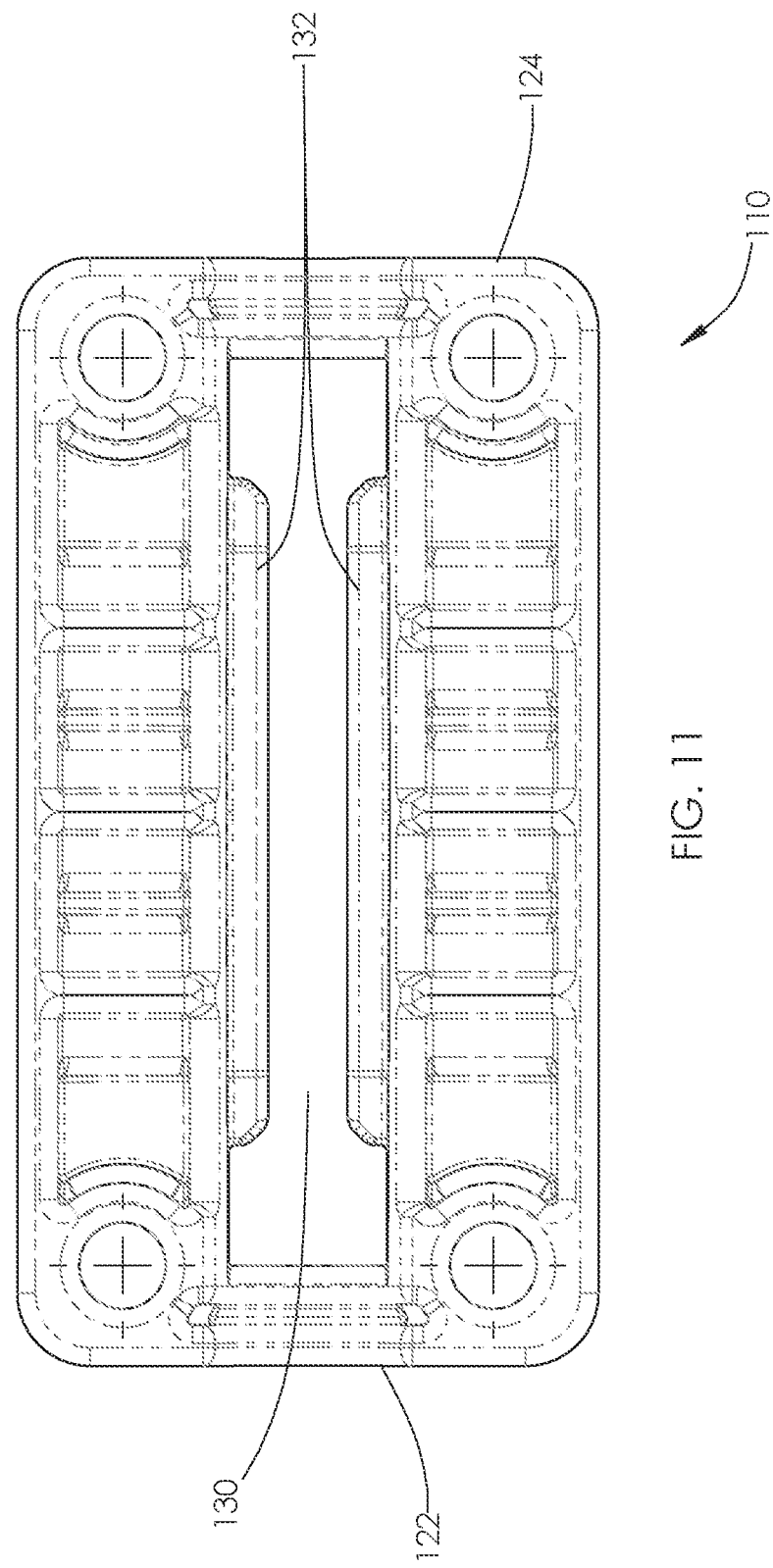
FIG. 11 is a bottom plan view of the accessory mounting track shown in FIG. 8.

In FIGS. 6 and 7, the accessory device 210 is tightened in relation to the accessory mounting track 110 with the physical interlocks 212 on the accessory device 210 mating with the one or more discrete physical mating interlocking features 114 provided along an accessory mounting track 110. In this manner, the accessory device 210 is mounted perpendicularly or transversely to the lengthwise direction of the accessory mounting track 110.

The exemplary accessory mounting track 110 is shown in FIGS. 8-11. The exemplary accessory mounting track 110 may be comprised of a first support flange 118, a second support flange 120, and a central axis (shown but not referenced), which is substantially parallel to the slot 112. The accessory mounting track 110 may also comprise a first end 122 and a second end 124 with a first slot entry point 126 and/or a second slot entry point 128, for receiving the T-bolt 214. The attachment holes 116 may be linearly disposed parallel to the central axis near the outermost edges of the first and second support flanges 118, 120. The attachment holes 116 may have a countersink feature or a counterbore feature (shown but not referenced). The accessory mounting track 110 may also comprise a channel 130, which is in communication with the slot 112, which may be bounded along opposing sides by a containment ledge 132.

The interlocking features 114 may be disposed along the first support flange 118 and along the second support flange 120 in spaced relation to one another between the attachment holes 116, and so that the interlocking features 114 along the first support flange 118 align with corresponding interlocking features 114 along the second support flange 120. The interlocking features 114 each has a width W1 (shown in FIG. 8). The slot 112 has a width W2 (shown in FIG. 10). The interlocks 212 have a width W3 (shown in FIG. 14). The width W3 of the interlocks 212 may be the same or approximately the same as the width W2 of the slot 112. In this way, the interlocks 212 may mate with the slot 112. Moreover, or alternatively, the width W3 of the interlocks 212 may be the same or approximately the same width as the width W1 of each of the interlocking features 114. In this way, the interlocks 212 may mate with the interlocking features 114, as well as, or alternatively, with the slot 112.

Figure 12:
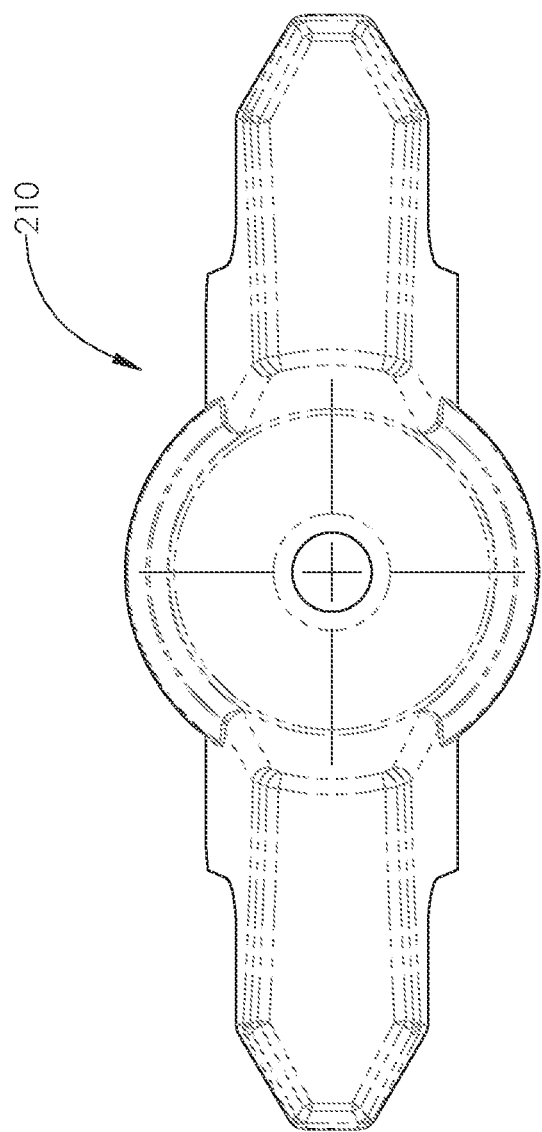
FIG. 12 is a top plan view of the accessory device shown in FIG. 1.
Figure 13:
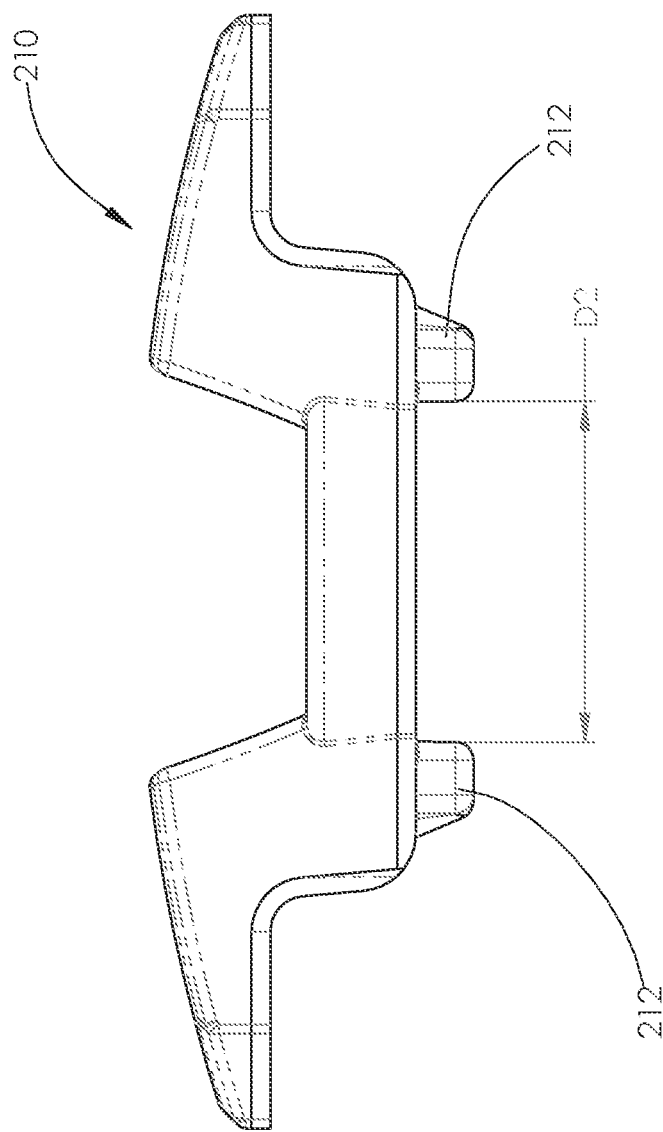
FIG. 13 is a side elevational view of the accessory mounting track shown in FIG. 12.
Figure 14:
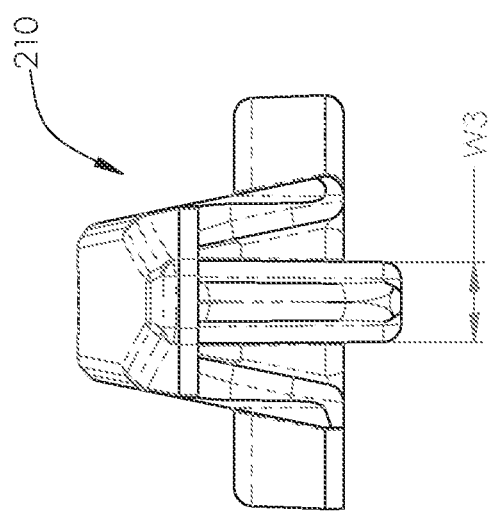
FIG. 14 is an end view of the accessory mounting track shown in FIG. 13.
Figure 15:
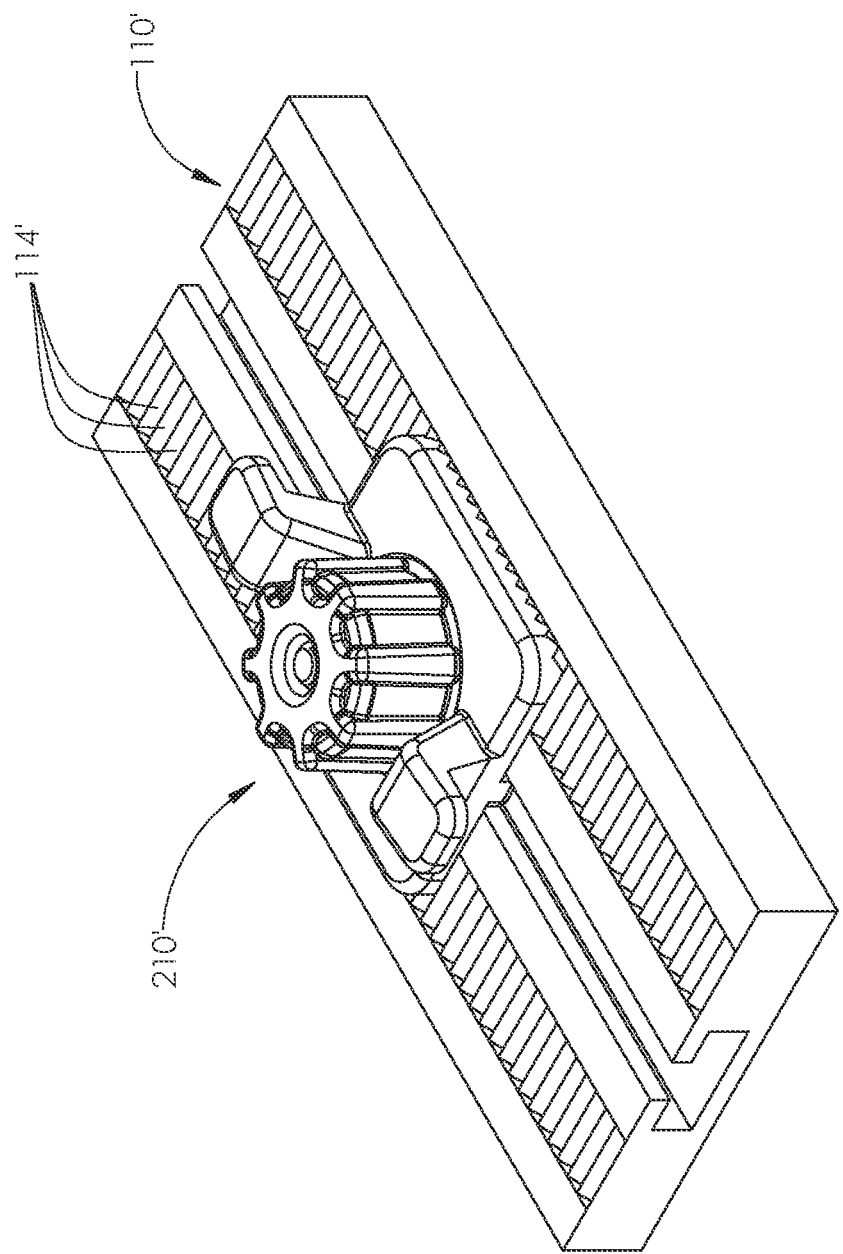
FIG. 15 is a side perspective view of an alternative accessory mounting track supported in relation to a base.
Figure 16:
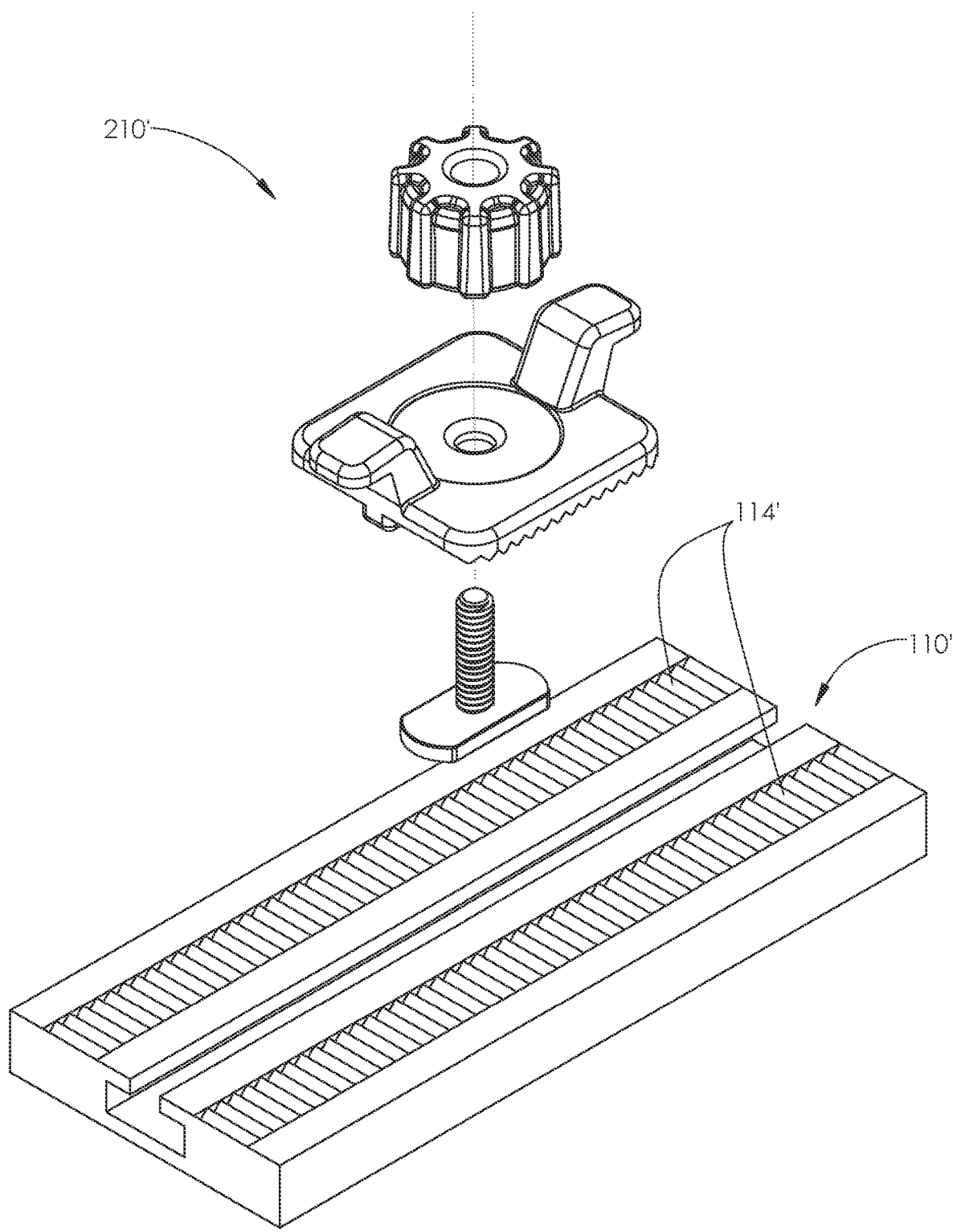
FIG. 16 is an exploded side perspective view of the accessory mounting track and base shown in FIG. 15.
Figure 17:
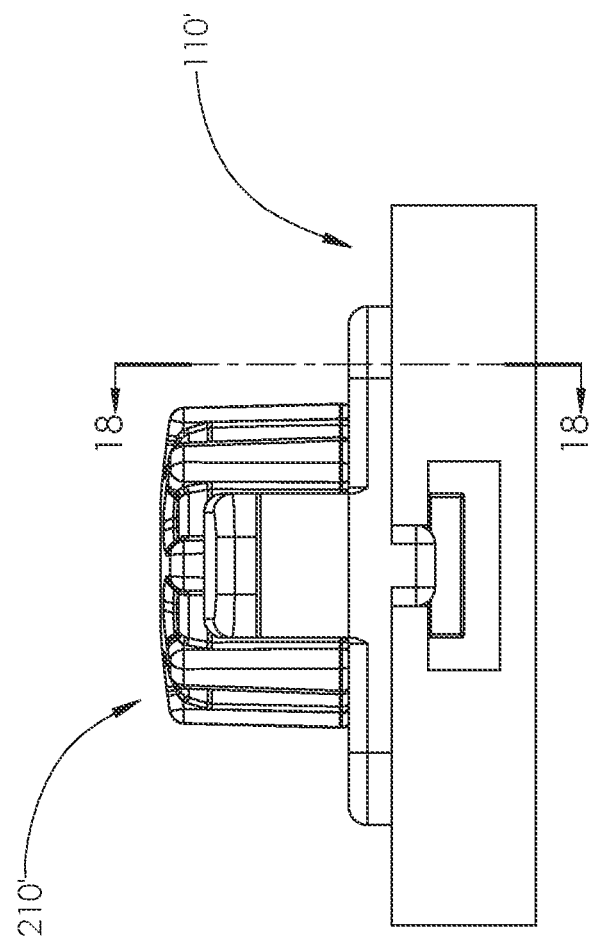
FIG. 17 is a front elevational view of the accessory mounting track and base shown in FIG. 15.
Figure 18:
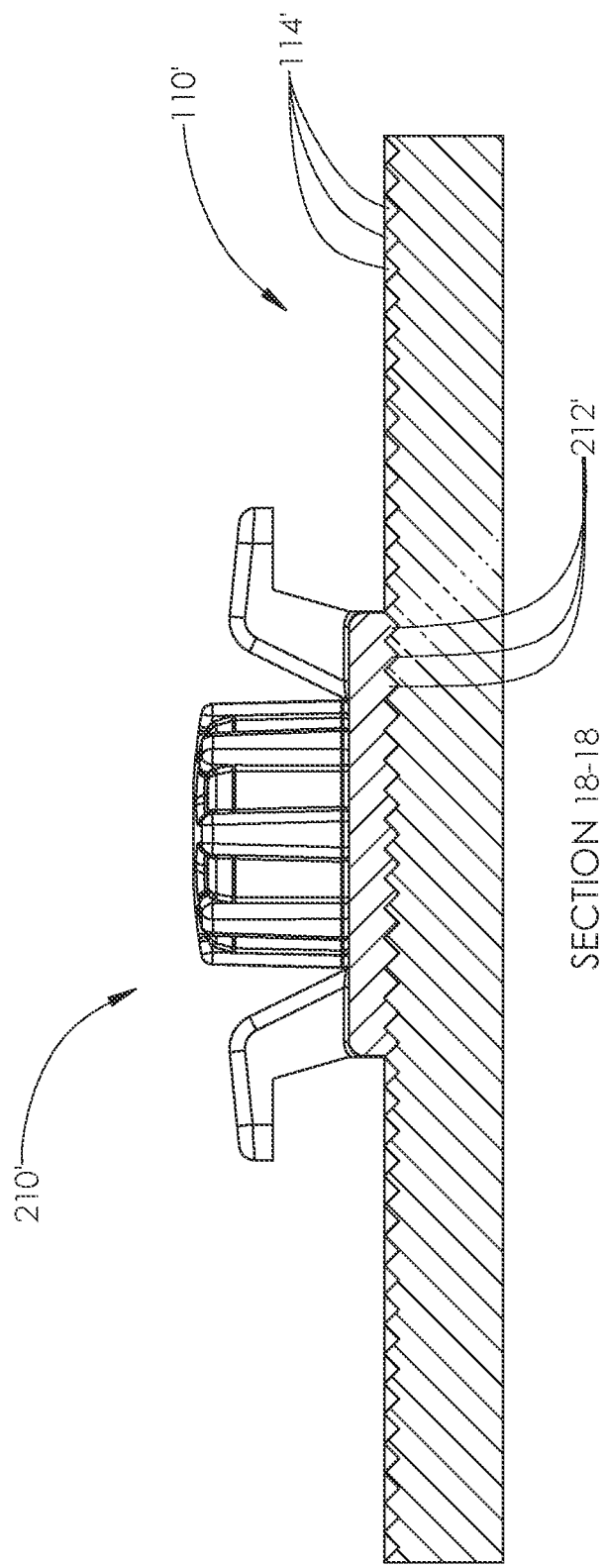
FIG. 18 is a cross-sectional view of the accessory mounting track taken along the line 18-18 in FIG. 17.

The exemplary accessory device 210 is shown in FIGS. 12-14. The exemplary accessory device 210 preferably has spaced interlocks 212 extending downward therefrom. The interlocks 212 are preferably in linear alignment with each other. The interlocking features 114 along the first support flange 118 and corresponding interlocking features 114 along the second support flange 120 are spaced a distance D1 (shown in FIG. 7) and the interlocks 212 are preferably spaced a distance D2 (shown in FIG. 13), approximately the same as the distance D1 between the interlocking features 114 along the first support flange 118 and the interlocking features 114 along the second support flange 120. In this way, the accessory device 210 may be either positioned along the central axis of the accessory mounting track 110 or transversely thereto.

The accessory device 210 may be attached to the accessory mounting track 110 by inserting the T-bolt 214 in a slot entry point 126, 128 (shown in FIG. 8), and further until the threaded stud 222 of the T-bolt 214 enters the slot 112 and a head 224 (shown in FIG. 3) of the T-bolt 214 enters the channel 130 (shown in FIG. 11), below the slot 112. Rotation of the head 224 in the channel 130 is restricted by the containment ledge 132 along the opposing sides of the channel 130. The head 224 is also prevented from escaping from the channel 130 by the containment ledge 132 along the opposing sides of the channel 130. The accessory device 210 may be positioned along the central axis of the accessory mounting track 110, with the channel 130 containing the T-bolt 214 therein, but not preventing movement along the central axis, until fully attached to the accessory mounting track 110.

It should be appreciated that by rotating the knob 218, the threads of the threaded stud 222 interact with the female threaded through hole 220, which may urge the accessory device 210 towards or away from the head 224 of the T-bolt 214, depending on the direction of rotation. When appropriately rotated, the accessory device 210 is urged towards the head 224 of the T-bolt 214 until the device 210 contacts an upper surface of the accessory mounting track 110 (or the friction washer 216) and head 224 contacts the containment ledge 132 along each side of the channel 130. When the device is turned further, friction is increased between these areas of contact, which effectively attaches the accessory device 210 in position. By rotating the device 210 in the opposite direction, the device 210 may once again be positioned along the central axis or removed from the accessory mounting track 110 through a slot opening 126, 128 by sliding the T-bolt 214 out of either end of the accessory mounting track 110.

The interlocks 212 communicate with the slot 112 in one position, preventing the accessory device 210 from rotating with respect to the slot 112. The knob 218 of the accessory device 210 may be tightened to apply frictional force between the underside of the accessory device 210 (or optionally, the friction washer 216) and the resistance to motion is a function of the compression provided by the knob 218 and the T-bolt 214. However, if sufficient force is applied in the direction of the slot 112, the accessory device 210 may ultimately slide in the slot 112.

However, if the accessory device 210 is rotated 90° with the interlocks 212 over the mating interlocking features 114 and the knob 218 is tightened so that the interlocks 212 mate with the interlocking features 114, the force required to move the accessory device 210 relative to the slot 112 would need to be sufficient to break either one or both of the parts (i.e., the accessory mounting track 110 or the accessory device 210). This position does not rely on frictional engagement, which permits ease of attachment (i.e., over-tightening the knob 218 serves no purpose when the interlocks 212 mate with the interlocking features 114) and which is removable by rotating the knob 218 to increase the gap (i.e., loosening the knob 218 to allow the interlocks 212 to be moved out of their mating relationship with the interlocking features 114).

It should be appreciated that the distance D1 between the interlocking features 114 in the preferred embodiment allows for positioning the accessory devices 210 in two positions. In the first position, along the central axis of the accessory mounting device 110, the width W1 of the interlocking features should be the same or approximately the same as the width W2 of the slot 112 to prevent unwanted rotation of the accessory device 210 in relation to the accessory mounting track 110. Such rotation could cause the knob 218 to inadvertently loosen in relation to the T-bolt 214. In this position, tension on the knob 218 dictates the ease or difficulty to move the accessory device 210 along the accessory mounting track 110.

By spacing the interlocks 212 a distance D2, and the interlocking features 114 along the first support flange 118 and corresponding interlocking features 114 along the second support flange 120 a distance D1 that is the same or approximately the same as the distance D2 between the interlocks 212, rotation of the accessory device 210 is prevented. Such rotation could cause the knob 218 to loosen in relation to the T-bolt 214. Excessive loosening is much more unlikely in this position.

If the interlocks 212 have a width W3 that is the same or approximately the same as the width W2 of the slot 112, and the distance D1 between the interlocking features 114 along the first and second support flanges 118, 120 is the same or approximately the same as the distance D2 between the interlocks 212, and the interlocking features 114 have a width W1 that is the same or approximately the same as the width W3 of the interlocks 212, positioning of the accessory device 210 is optimized.

Although two interlocks 212 are shown, the invention may be carried out with one or more interlocks 212. Additionally, although interlocking features 114 are shown along each of the opposing support flanges 118, 120, interlocking features 114 may be provided along one or the other support flange 118, 120, if only one interlock 212 is employed.

Moreover, if only one interlock 212 is employed, interlocking features 114 may be provided along each of the opposing support flanges 118, 120, and staggered in relation to the interlocking features 114 provided along the opposing support flange 118, 120, for more finite positioning of the accessory device 210.

The spacing of the interlocking features 114 and the interlocks 212 may be dictated by a combination of manufacturing tolerances and/or techniques (e.g., wall thicknesses and filling voids in molds with plastics versus milling or casting metal), material strength as it relates to the thickness of the area adjacent to the interlocking features 114, and aesthetics.

There should be little, aside from friction and the angle of the threads, preventing the knob 218 from becoming loosened, as there is little to encourage the knob 218 from releasing from a T-bolt 214. Absent any excessive vibration or a direct attempt to consciously loosen the knob 218, the knob 218 should remain affixed to the T-bolt 214. The width W1 of the interlocking features 114 and the width W2 of the slot 112 is preferably the same or approximately the same as (i.e., closely matched to) the width W3 of the interlocks 212, to reduce the risk that the knob 218 will become loosened in relation to the accessory device 210.

The accessory mounting track 110 may comprise an extruded profile with attachment holes 116. The length of the accessory mounting track 110 may vary as may the number of attachment holes 116. The attachment holes 116 may be disposed linearly near the outer edges of the accessory mounting track 110 or linearly, approximately centered and along the longest axis (i.e., the central axis) of the accessory mounting track 110. The attachment holes 116 may be of the counter bore or countersink type, as shown, or may be simple through holes. The accessory mounting track 110 may be comprised of a recess, which may be concave, angular, or another shape, allowing clearance for attaching to rounded or irregular surfaces and maximizing stability by enabling the supporting environment to contact the accessory mounting track 110 along the edges. The region near the outer edges of the underside of the accessory mounting track 110 may be flat and approximately aligned with the rows of attachment holes 116 to maximize lateral stability. Such a configuration is disclosed in U.S. patent application Ser. No. 13/954,253, filed on Jul. 30, 2013, which issued as U.S. Pat. No. 9,671,060, on Jun. 6, 2017, the disclosure of which is incorporated herein by reference in its entirety.

The accessory mounting track 110 composition may be of a lightweight material, such as aluminum or plastic, or a composite comprising two or more such materials. The surface of the accessory mounting track 110 may be treated for harsh environmental exposure, such as UV radiation and saltwater. The upper surface of the accessory mounting track 110 may be textured with any suitable texture to improve the gripping characteristics of that surface, which may increase resistance to accessory devices mounted to that surface from slipping either by rotation or linearly along the axis of the accessory mounting track 110. This texture may be the result of geometry in the shape of the accessory mounting track 110, such as ridges or grooves in the surface. Alternately or in addition to this geometry, the texture may be the result of etching, application of plastic or rubberized coating, or other surface treatments.

Attachment of the accessory mounting track 110 to a support surface may be achieved by putting the screws 117 or other suitable fasteners through one or more of the attachment holes 116 and into the surface on which the accessory mounting track 110 is to be mounted. In some configurations, the accessory mounting track 110 may be attached to an adapter bracket, such as a rail clamp, for attachment to the environment, or molded or integrated into the support surface.

It should be understood that the accessory mounting track may take on other configurations. For example, an accessory mounting track 110' could include interlocking features 114' in the form of serrations, or a saw tooth configuration, which could cooperate with similar interlocks 212' of an accessory device 210'. The interlocking features 114' and interlocks 212' could be angled such that the accessory device 210' could be adjusted more easily to discrete location by pushing the accessory device 210' along the axis of the accessory mounting track 110', rather than lifting and sliding the accessory device 210', when the tension of the T-bolt 214 is sufficiently loosened to allow the accessory device 210' to disengage the interlocking features 114'.

Figure 19:
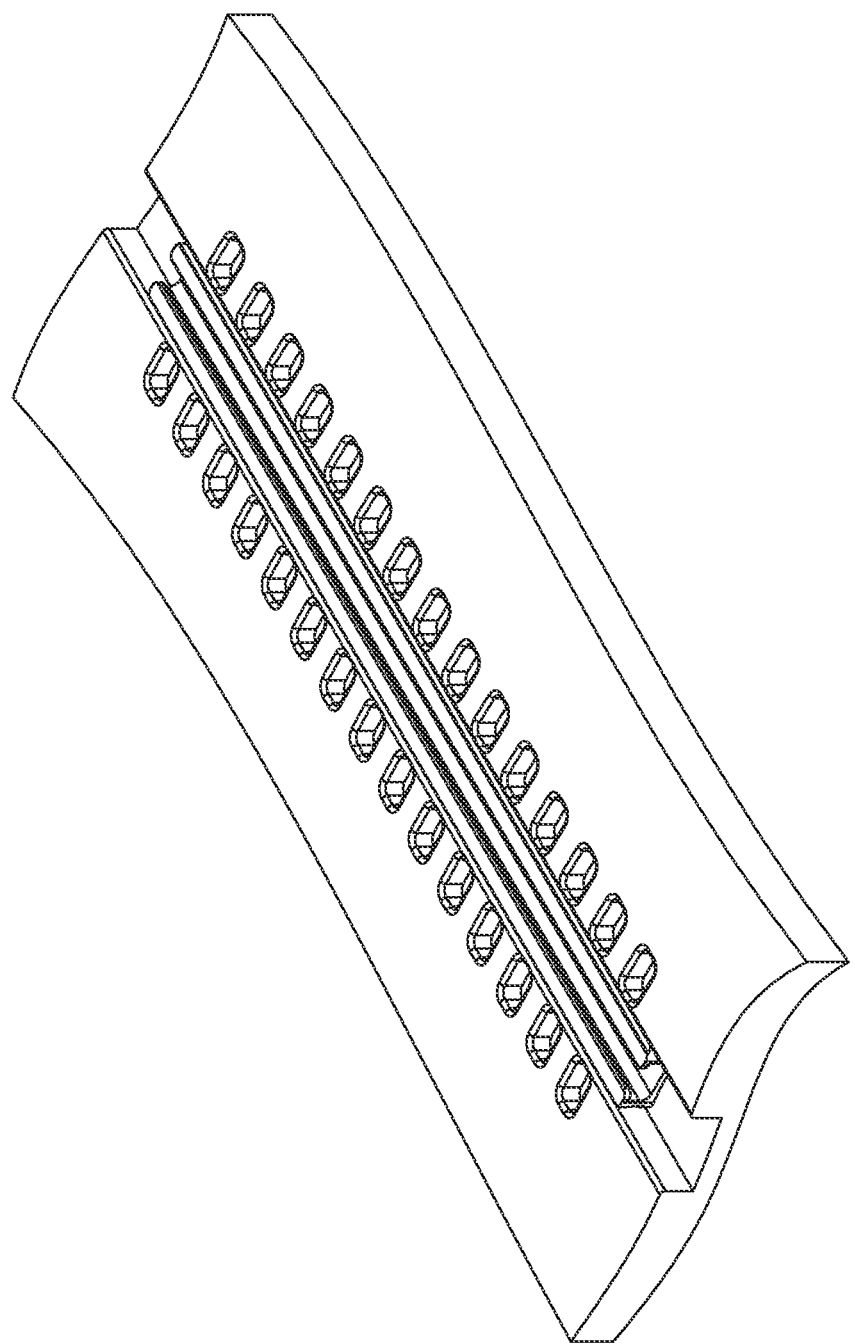
FIG. 19 is a side perspective view of an alternative accessory mounting track supported in relation to an environment, with recessed interlocking features supported in relation to the environment.
Figure 20:
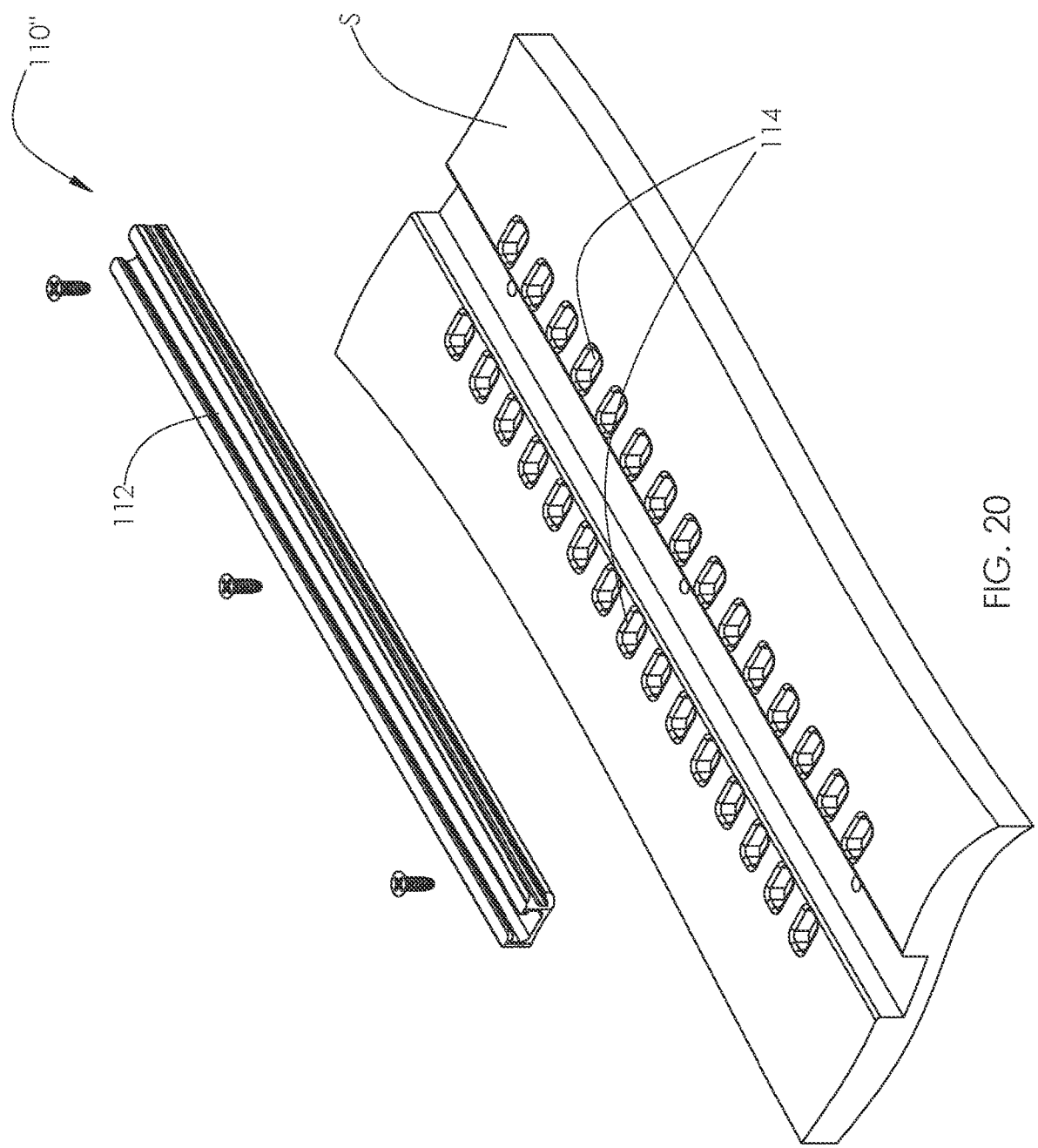
FIG. 20 is an exploded side the accessory mounting track and environment shown in FIG. 19.
Figure 21:
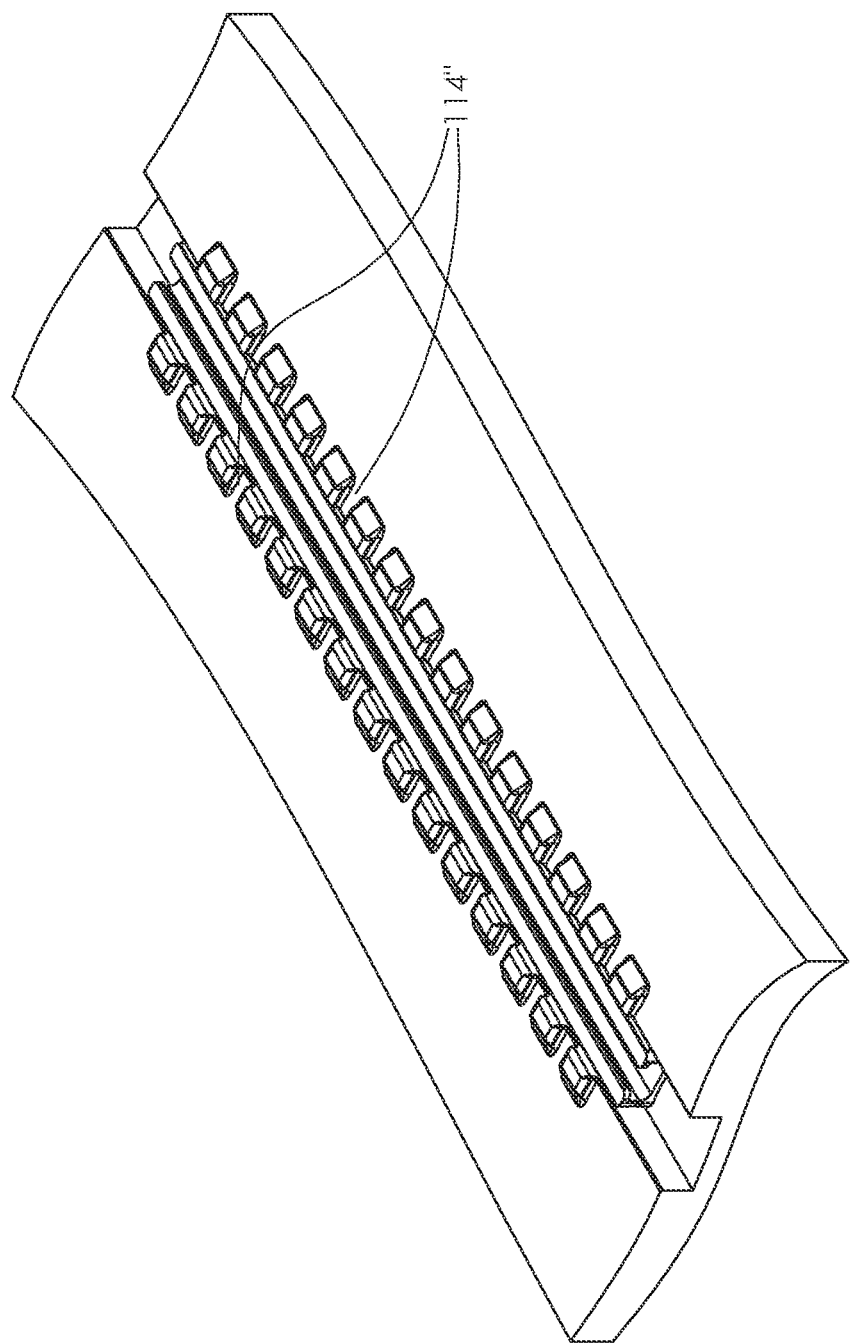
FIG. 21 is a side perspective view of an alternative accessory mounting track supported in relation to an environment, with raised interlocking features supported in relation to the environment.
Figure 22:
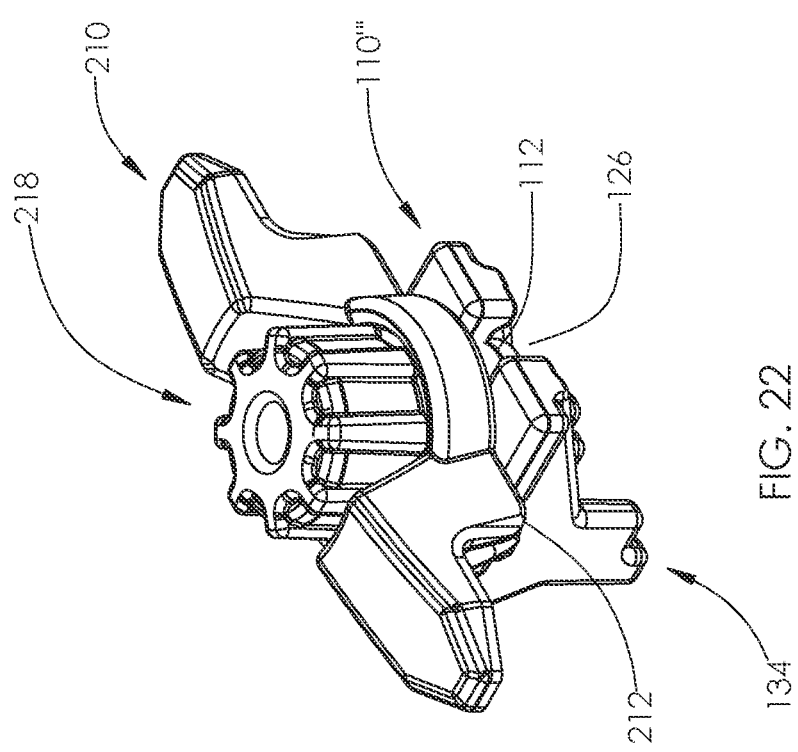
FIG. 22 is a side perspective view of an alternative accessory mounting track supported in relation to a base.
Figure 23:
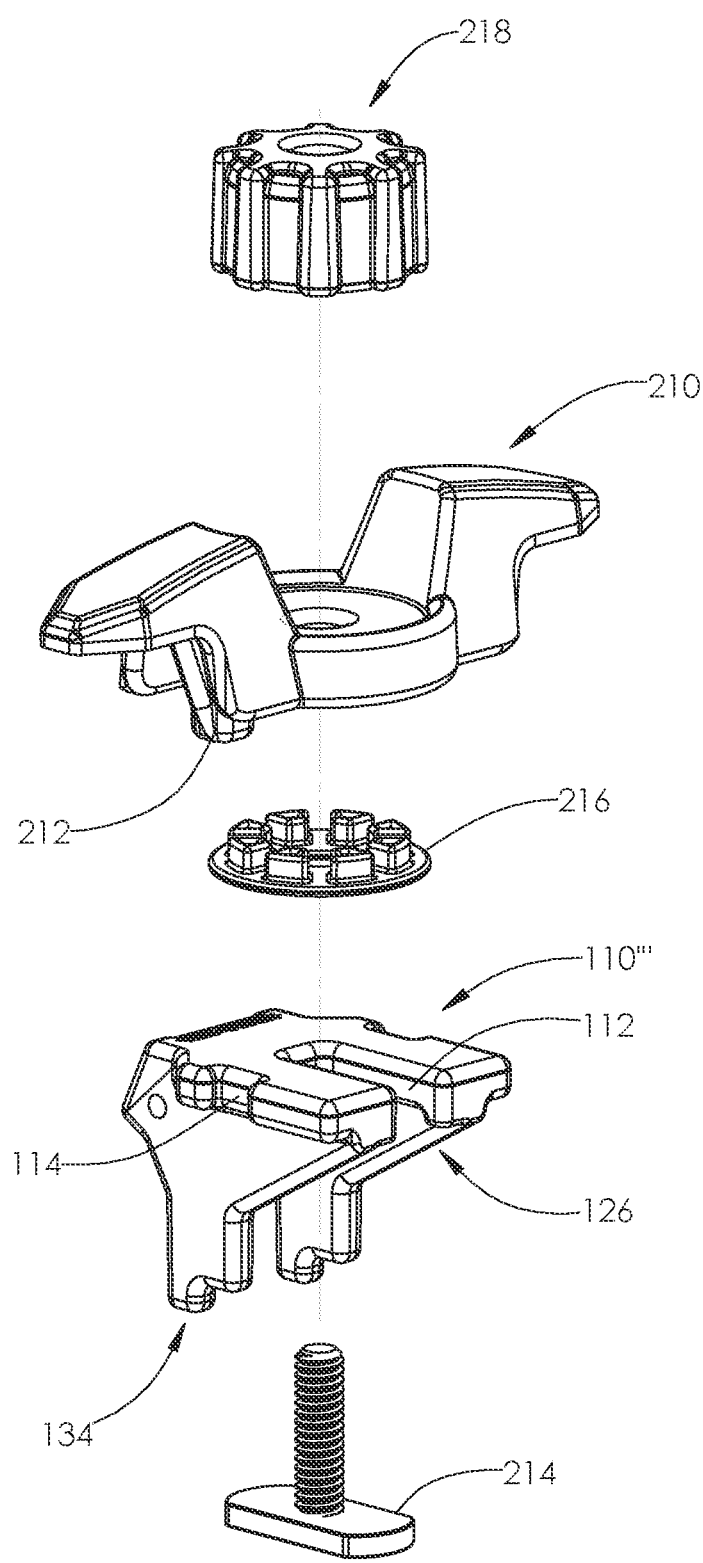
FIG. 23 is an exploded side perspective view of the accessory mounting track and base shown in FIG. 22
Figure 24:
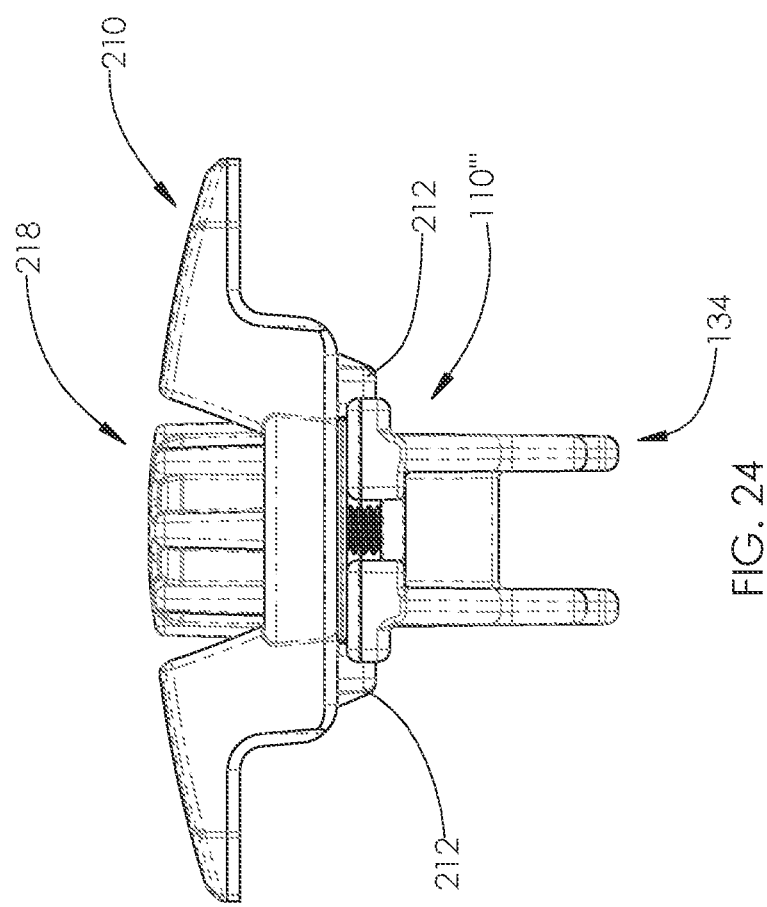
FIG. 24 is a front elevational view of the accessory mounting track and base shown in FIG. 22.
Figure 25:
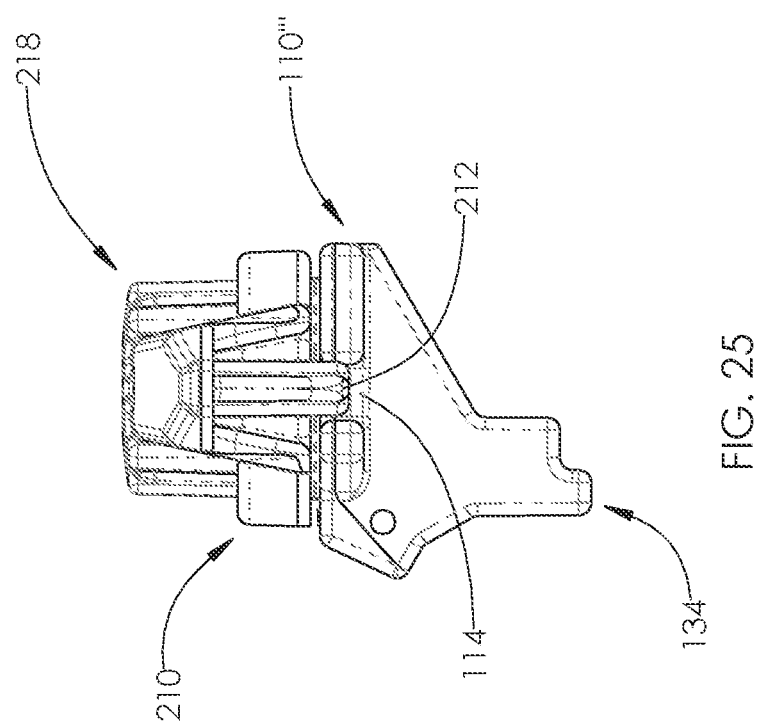
FIG. 25 is a side elevational view of the accessory mounting track and base shown in FIG. 22.

It should be appreciated that a slot 112 may be molded into or mounted to an environment, wherein the mounting surface has one or more interlocking features 114. For example, as shown in FIGS. 19 and 20, an accessory mounting track 110" may be molded into or mounted in relation to an environment surface S, such as the surface of the hull of a kayak, with interlocking features 114 in the surface S along opposing sides of the slot 112 accessory mounting track 110". The accessory mounting track 110" may be extruded or otherwise formed from aluminum, plastic, or other suitable material. As shown throughout the drawings, interlocking features 114 may be recessed. Alternatively, it should also be appreciated that interlocking features 114" may be raised in relation to a supporting surface, whether integral with the surface of the accessory mounting track or the environment, as shown in FIG. 21. In this case, an accessory device may include one or more interlocks, which may have one or more recess features that are configured to engage the raised interlocking features 114". The interlocking features 114" may be arranged linearly along opposing sides of the accessory mounting track 110".

The accessory mounting track 110, 110',110" profile may contain an internal C-shaped slot or other suitable shape to receive a tee-bolt, sliding nut, or other connecting feature internally with which to attach accessory devices.

Although a T-bolt attachment method is depicted in these drawings, other methods of securing and removing attachment of devices to the accessory mounting track 110, 110',110" may also be used. For example, in an alternate configuration, a slot nut and stud configuration (not shown) may be used instead of a T-bolt. In this configuration, the slot nut may be inserted into the slot 112 instead of the head 224 of the T-bolt 214. The slot nut would not necessarily be permanently attached to the stud as it is in the T-bolt configuration, but instead would have female threads that interact with a stud, resulting in a tightening effect that is similar to that of the T-bolt configuration.

The invention allows the attachment of an accessory device 210, 210' at a discrete point or series of discrete points along the accessory mounting track 110, 110',110" when sliding the accessory device 210, 210' along the accessory mounting track 110, 110',110" may be an undesirable consequence of loading the accessory device 210, 210' generally along the direction of the slot 112. Rubber friction washers 216 can be used to increase static friction to minimize sliding between surfaces, but can be overcome with enough force, creating wear between the accessory mounting track 110, 110',110" and the friction surface, ultimately leading to more slipping of the accessory device 210, 210' as one of the surfaces wears. Additionally, various users may have various grip strength to tighten or loosen the compression of the friction, making secure attachment or the ability to remove the attached accessory device 210, 210' uncertain. Additionally, rotation of the accessory device 210, 210' can result in rotation of the threaded knob 218 used to secure the accessory device 210, 210', resulting in the accessory device 210, 210' (thought to be secured) becoming loose when the accessory device 210, 210' rotates relative to the accessory mounting track 110, 110',110" and/or T-bolt 214.

The addition of the interlocking features 114 along the outside of the slot 112 (on one or both sides of the accessory mounting track 110, 110',110"), in communication with the interlocks 212, 212', which could mate the accessory device 210, 210' in the slot 112 to prevent rotation of the accessory device 210, 210', could prevent translation of the accessory device 210, 210' along the slot 112, even if static friction forces are exceeded. Simply rotating the accessory device 210, 201' or the knob 218 to a point where the interlocks 212, 212' are communicating with the interlocking features 114, 114',114" prevents rotation of the accessory device 210, 210' and translation of the accessory device 210, 210' along the accessory mounting track 110, 110'.

In accordance with the present invention, the interlocking features 114, 114',114" are oriented along opposing sides of the slot 112, arranged in a lengthwise direction of the accessory mounting track 110, 110',110". It is conceivable that the interlocking features 114, 114',114" could be keys or detents, as shown, or raised bosses (not shown). The accessory device 210, 210' may be attached and/or tightened to the accessory mounting track 110, 110',110" by positioning the interlocks 212, 212' in relation to the slot 112 or the interlocking features 114, 114',114". The accessory device 210, 210' may be attached to the accessory mounting track 110, 110',110" in a lengthwise direction so that the interlocks 212, 212' engage the slot 112. Alternatively, the accessory device 210, 210' may be attached generally perpendicularly to the accessory mounting track 110, 110',110", with the interlocks 212, 212' engaging the interlocking features 114, 114',114". When the accessory device 210, 210' is tightened to the accessory mounting track 110, 110',110" with the interlocks 212, 212' engaging the interlocking features 114, 114',114", the accessory device 210, 210' is attached in place with respect to both rotation and travel in any direction. This is a significant improvement over conventional attachment devices, which can fail once static friction forces are exceeded. Friction forces are a function of the materials being clamped together, and the force with which they are attached. With the interlocks 212, 212' engaging the interlocking features 114, 114',114", the resistance to movement is independent of frictional forces.

It should be appreciated that the discrete interlocking features 114, 114',114" are preferably located generally perpendicular to a longitudinal direction of the accessory mounting track 110, 110',110", although the angle of interlocking features 114, 114' may be at any angle other than in line with the track slot 112.

It should be appreciated that the interlocks 212, 212' on the accessory device 210, 210' cooperate with the slot 112 in the accessory mounting track 110, 110',110", regardless of the presence of the interlocking features 114, 114',114" on the accessory mounting track 110, 110',110" perpendicular to the slot 112. However, the interlocking features 114, 114',114" on the accessory mounting track 110, 110',110" mating with the interlocks 212, 212' on the accessory device 210, 210' physically prevent the accessory device 210, 210' from moving with relation to the slot 112 when the knob 218 is sufficiently tightened, due to physical interference rather than simple friction. Minimal grip strength and minimal torque may be applied to the knob 218 to lock the accessory device 210, 210' in place in relation to the accessory mounting track 110, 110',110". This reduces the risk of over stressing the accessory device 210, 210' or components thereof, which results in accessory devices becoming broken.

It should be understood that an accessory mounting track 110''' may include a slot 112 that may be sufficiently short to accept a T-bolt 214 but not interlocks 212 of the accessory device 210, as shown in FIGS. 18-27. However, when the accessory device 210 is rotated (e.g., 90 degrees), the interlocks 212 may engage corresponding interlocking features 114 along opposing sides of the slot 112. An accessory mounting track 110''' according to this embodiment may be useful to minimize the overall footprint thereof. In the illustrated embodiment, the accessory mounting track 110''' may be supported in relation to a base 134, which may attach to another part, such as the HOBIE H-RAIL™ manufactured by HOBIE CAT COMPANY of Oceanside, California. Clearly, the slot 112 and interlocking features 114 may be supported in relation to any suitable environment and a single slot entry point 126 for a T-bolt 214 may be provided to minimize the footprint of the accessory mounting track 110'''. Moreover, the slot 112 is not required to communicate with one or both of the interlocks 212 of the accessory device 210. Clearly, the accessory device 210, 210' could have one interlock 212, 212' extending from one end thereof.

It should be noted that any orientational terms used throughout this description are with reference to the orientation of the invention and component parts thereof as presented in the accompanying drawings, which is subject to change. Therefore, orientational terms, if used, are for semantic purposes, and do not limit the invention or its component parts in any particular way.

It should be understood that the accessory device 210, 210' (i.e., the cleat) is merely shown for exemplary purposes. A vast number of accessory devices can be used with this accessory mounting track 110, 110',110",110'''.

It should be appreciated that the invention may be formed of any suitable material, including, for example, metal, plastic, or other suitable material. Various components thereof may be of solid construction or hollow, or a combination thereof. The same may be cast, cut, molded, extruded, or formed in some other suitable manner.

While the invention and components parts thereof may have been described herein in terms of certain components being referred to in either the singular or the plural, other arrangements are possible. For example, it is to be understood that due to the conceptual description presented herein, components presented in the singular may be provided in the plural, and vice versa.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

PARTS LIST 110 accessory mounting track
112 slot
114 interlocking features
116 attachment holes 117 socket head cap screws
118 first support flange
120 second support flange
122 first end
124 second end
126 first slot entry point
128 second slot entry point
130 channel
132 containment ledge
134 base
210 accessory device
212 interlocks
214 T-bolt
216 rubber friction washer
218 knob
220 female threaded through hole
222 threaded stud
224 head
W1 interlocking feature width
W2 slot width
W3 interlock width
D1 distance between opposing interlocking features
D2 distance between interlocks

What is claimed is:

1. A combination comprising:
an accessory mounting track comprising:
a slot for receiving a threaded stud of a T-bolt therethrough,
at least one interlocking feature laterally spaced from the slot,
an accessory device comprising a feature that is threadably enageable with the T-bolt to urge the accessory device toward and or permit the accessory device to move away from the accessory mounting track, the accessory device comprising:
at least one interlock supported by the accessory device, the at least one interlock keyed to mate with the at least one interlocking feature for mounting the accessory device in a direction perpendicular or approximately perpendicular to a lengthwise direction of the accessory mounting track or alternatively, mate with the slot for mounting the accessory device in the lengthwise direction of the accessory mounting track.

2. The combination of claim 1, wherein the accessory mounting track further comprises opposing mounting surfaces each having a lateral edge, wherein the at least one interlocking feature is one of a plurality of interlocking features, at least one of the interlocking features along the lateral edge of each one of the opposing mounting surfaces.

3. The combination of claim 2, wherein the interlocking features are spaced apart from each other by a distance, and wherein the at least one interlock is one of a plurality of interlocks spaced apart by a distance that is the same or approximately the same as the distance between the interlocking features, the interlocks mating with corresponding ones of the interlocking features.

4. The combination of claim 2, wherein the interlocking features are pockets, and the interlocks are nodules for mating with the pockets.

5. The combination of claim 4, wherein the pockets extend in a direction perpendicular or approximately perpendicular to the lengthwise direction of the accessory mounting track.

6. The combination of claim 2, wherein the interlocking features are serrations, and the interlocks comprise at least one tooth for mating with the serrations.

7. The combination of claim 1, wherein the accessory device forms no part of the T-bolt.

8. The combination of claim 1, wherein the slot is configured to prohibit passage of the T-bolt therethrough regardless of the orientation of a head of the T-bolt.

9. A combination comprising:
an accessory mounting track comprising:
a slot for receiving a threaded stud of a T-bolt,
a channel within the track for receiving a head of the T-bolt, the channel in communication with the slot, and
at least one interlocking feature laterally spaced from the slot,
an accessory device comprising:
a threaded hole configured to threadably interact with the threaded stud to urge the accessory device toward and permit the accessory device to move away from the accessory mounting track, and
at least one interlock supported by the accessory device, the at least one interlock keyed to mate with the at least one interlocking feature for mounting the accessory device in a direction perpendicular or approximately perpendicular to a lengthwise direction of the accessory mounting track or alternatively, mate with the slot for mounting the accessory device in the lengthwise direction of the accessory mounting track, and when mounted in the lengthwise direction of the accessory mounting track, positioning of the accessory device along the accessory mounting track is not restricted to a discrete position provided by the at least one interlocking feature.

10. The combination of claim 9, wherein the accessory mounting track further comprises opposing mounting surfaces each having a lateral edge, wherein the at least one interlocking feature is one of a plurality of interlocking features, at least one of the interlocking features along the lateral edge of each one of the opposing mounting surfaces.

11. The combination of claim 10, wherein the interlocking features are spaced apart from each other by a distance, and wherein the at least one interlock is one of a plurality of interlocks spaced apart by a distance that is the same or approximately the same as the distance between the interlocking features, the interlocks mating with corresponding ones of the interlocking features.

12. The combination of claim 10, wherein the interlocking features are pockets, and the interlocks are nodules for mating with the pockets.

13. The combination of claim 12, wherein the pockets extend in a direction perpendicular or approximately perpendicular to the lengthwise direction of the accessory mounting track.

14. The combination of claim 10, wherein the interlocking features are serrations, and the interlocks comprise at least one tooth for mating with the serrations.

15. The combination of claim 9, wherein the accessory device forms no part of the T-bolt.

16. The combination of claim 9, wherein the slot is configured to prohibit passage of the T-bolt therethrough regardless of the orientation of the head.

17. A combination comprising:
an elongated accessory mounting track comprising:
a slot atop the accessory mounting track and extending in a longitudinal direction with respect to the accessory mounting track, the stop for receiving a threaded stud of a T-bolt therethrough, a plurality of pockets including at least one pocket provided along opposing lateral sides of the track and spaced laterally of opposing sides of the slot, an accessory device comprising a feature that is threadably engageable with the T-bolt to urge the accessory device toward and or permit the accessory device to move away from the accessory mounting track, the accessory device comprising:

at least one nodule extending downward in relation to the accessory device, the at least one nodule keyed to mate with the at least one of the pockets for mounting the accessory device in at least one discrete position perpendicular or approximately perpendicular to a lengthwise direction of the accessory mounting track or alternatively, mate with the slot for mounting the accessory device in the lengthwise direction of the accessory mounting track, and when mounted in the lengthwise direction of the accessory mounting track, positioning of the accessory device along the accessory mounting track is not restricted to the at least one discrete position but is positionable anywhere along the accessory mounting track.

\* \* \* \* \*